(12) United States Patent
Inoue et al.

(10) Patent No.: US 8,741,003 B2
(45) Date of Patent: Jun. 3, 2014

(54) APPARATUS AND METHOD FOR PRESENTING STEREOSCOPIC VIDEO

(71) Applicant: Panasonic Corporation, Osaka (JP)

(72) Inventors: Tsuyoshi Inoue, Nara (JP); Jun Ozawa, Nara (JP)

(73) Assignee: Panasonic Corporation, Osaka (JP)

( * ) Notice: Subject to any disclaimer, the term of this patent is extended or adjusted under 35 U.S.C. 154(b) by 87 days.

(21) Appl. No.: 13/626,946

(22) Filed: Sep. 26, 2012

(65) Prior Publication Data

US 2013/0021458 A1     Jan. 24, 2013

Related U.S. Application Data

(63) Continuation of application No. PCT/US2012/002344, filed on Apr. 4, 2012.

(30) Foreign Application Priority Data

May 20, 2011   (JP) .................................. 2011-114010

(51) Int. Cl.
*H04N 13/04* (2006.01)
*G02B 27/22* (2006.01)

(52) U.S. Cl.
CPC ................................. *H04N 13/0438* (2013.01)
USPC .............................................. 48/56; 359/462

(58) Field of Classification Search
CPC .............. G02B 27/0093; G02B 27/22; G02B 27/2264; H04N 13/0438; H04N 2213/008
USPC ................................ 348/56, 51; 359/464, 462
See application file for complete search history.

(56) References Cited

U.S. PATENT DOCUMENTS

| | | | |
|---|---|---|---|
| 2011/0025821 A1* | 2/2011 | Curtis et al. | 348/43 |
| 2011/0028805 A1 | 2/2011 | Yamazaki | |
| 2011/0063421 A1 | 3/2011 | Kubota | |
| 2011/0187822 A1* | 8/2011 | Yoo | 348/43 |
| 2011/0267442 A1 | 11/2011 | Imai et al. | |
| 2011/0273543 A1* | 11/2011 | Ushio et al. | 348/54 |
| 2012/0242810 A1* | 9/2012 | Florencio et al. | 348/51 |
| 2013/0160039 A1* | 6/2013 | Mentz et al. | 725/14 |

FOREIGN PATENT DOCUMENTS

| | | |
|---|---|---|
| JP | 9-018894 | 1/1997 |
| JP | 2001-148865 | 5/2001 |
| JP | 3159962 | 6/2010 |
| JP | 2010-259006 | 11/2010 |
| JP | 2011-003992 | 1/2011 |
| JP | 2011-028633 | 2/2011 |
| JP | 2011-064894 | 3/2011 |
| WO | 2010/084849 | 7/2010 |

OTHER PUBLICATIONS

International Search Report issued May 1, 2012 in International (PCT) Application No. PCT/JP2012/002344.

\* cited by examiner

*Primary Examiner* — Behrooz Senfi
(74) *Attorney, Agent, or Firm* — Wenderoth, Lind & Ponack, L.L.P.

(57) ABSTRACT

Provided is a stereoscopic video presenting apparatus including: an eye movement measurement unit configured to measure an eye movement of each of users viewing the stereoscopic video; a user count determination unit configured to determine the number of users viewing a same stereoscopic video; and a failure state determination unit configured to compare, when the user count determination unit determines that the number of users viewing the same stereoscopic video is plurality, eye movements of a plurality of users to determine a user whose eye movement is in a failure state among the plurality of users.

9 Claims, 34 Drawing Sheets

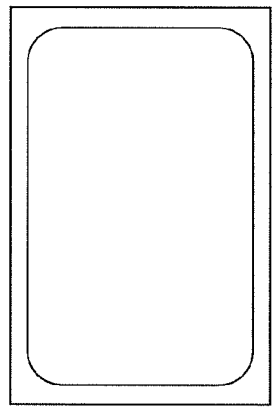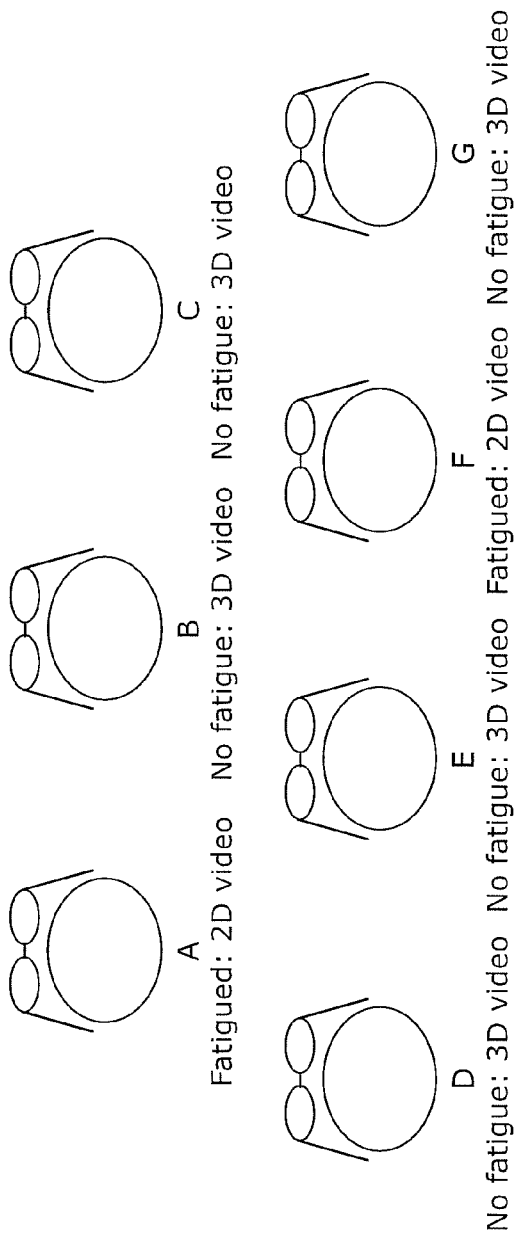
FIG. 3

FIG. 10

| Date and time of measurement | Ch1 | Ch2 | Ch3 | Ch4 | Ch1- Ch2 | Ch3 - Ch4 |
|---|---|---|---|---|---|---|
| 2010 Aug 3 19:00:10:005 | -12.35 | -18.08 | -37.3 | -48.59 | -14.18 | 13.491 |
| 2010 Aug 3 19:00:10:010 | -12.8 | -18.83 | -37.65 | -49.17 | -14.35 | 13.144 |
| 2010 Aug 3 19:00:10:015 | -13.38 | -19.78 | -38.39 | -50.1 | -14.59 | 12.838 |
| 2010 Aug 3 19:00:10:020 | -13.89 | -20.07 | -38.49 | -50.62 | -14.23 | 12.318 |
| 2010 Aug 3 19:00:10:025 | -13.56 | -19.08 | -37.67 | -50.06 | -13.43 | 11.936 |
| 2010 Aug 3 19:00:10:030 | -11.23 | -16.56 | -35.23 | -47.45 | -13.12 | 12.012 |
| 2010 Aug 3 19:00:10:035 | -10.13 | -15.85 | -34.23 | -46.25 | -13.37 | 12.096 |
| 2010 Aug 3 19:00:10:040 | -11.89 | -18.1 | -36.61 | -48.8 | -13.73 | 11.825 |
| 2010 Aug 3 19:00:10:045 | -13.01 | -19.21 | -37.97 | -50.21 | -13.6 | 11.659 |
| 2010 Aug 3 19:00:10:050 | -14.41 | -20.56 | -38.83 | -51.36 | -13.41 | 11.263 |
| 2010 Aug 3 19:00:10:055 | -14.5 | -20.11 | -38.21 | -51.78 | -12.76 | 10.125 |
| ... | ... | ... | ... | ... | ... | ... |

| 3701 | 3702 | 3703 | 3704 | 3705 |
|---|---|---|---|---|
| 1 | 0.033 | 566.91, 567.07, 567.02,... | 190.04, 189.90, 189.83,... | 376.87, 377.17, 377.19,... |

FIG. 18

| Date and time of measurement | ID1 902 | | ID1 1103 | | ID2 | | ID2 | | ... |
|---|---|---|---|---|---|---|---|---|---|
| | Ch1 | Ch2 | ... | ... | Ch1 | Ch2 | ... | ... | ... |
| 2010 Aug 3 19:00:10:005 | 3.13 | -8.85 | ... | ... | 8.16 | -6.26 | ... | ... | ... |
| 2010 Aug 3 19:00:10:010 | 1.68 | 0.69 | ... | ... | 5.49 | -3.20 | ... | ... | ... |
| 2010 Aug 3 19:00:10:015 | -3.59 | 11.22 | ... | ... | 12.21 | -9.54 | ... | ... | ... |
| 2010 Aug 3 19:00:10:020 | 7.33 | 2.67 | ... | ... | 14.35 | -9.46 | ... | ... | ... |
| 2010 Aug 3 19:00:10:025 | 16.79 | -10.91 | ... | ... | 12.90 | -3.43 | ... | ... | ... |
| 2010 Aug 3 19:00:10:030 | 9.46 | -7.17 | ... | ... | 7.55 | -9.23 | ... | ... | ... |
| 2010 Aug 3 19:00:10:035 | 3.28 | -6.64 | ... | ... | 0.23 | 0.53 | ... | ... | ... |
| 2010 Aug 3 19:00:10:040 | -1.91 | -4.27 | ... | ... | -7.71 | -1.91 | ... | ... | ... |
| 2010 Aug 3 19:00:10:055 | 2.82 | -4.04 | ... | ... | 8.32 | -14.12 | ... | ... | ... |
| ... | ... | ... | ... | ... | ... | ... | ... | ... | ... |

901

FIG. 19A
Eyes correctly perceiving stereoscopic view
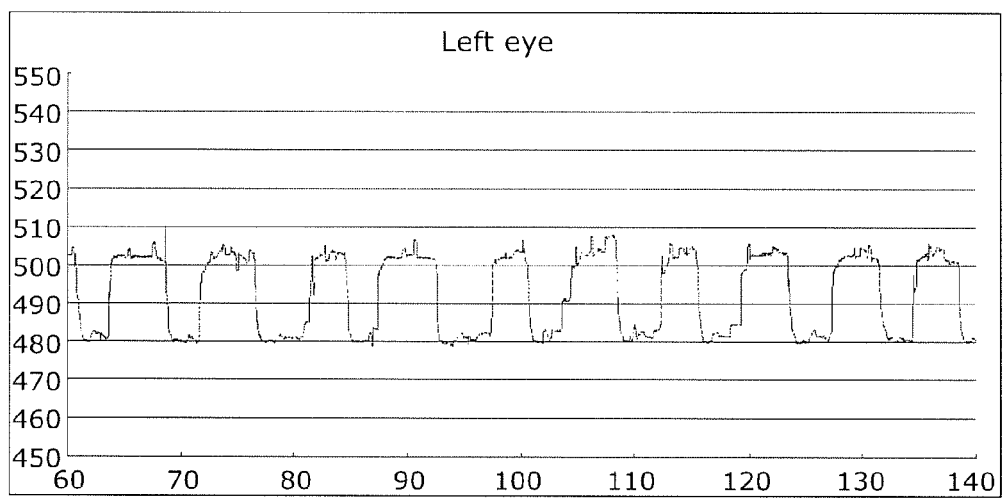
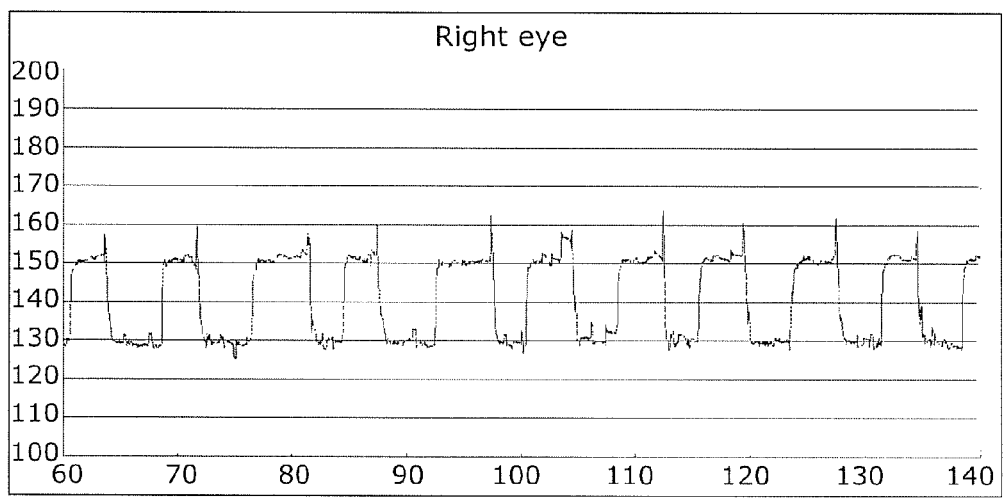

FIG. 19B
Eyes partially unable to perceive stereoscopic view due to fatigue
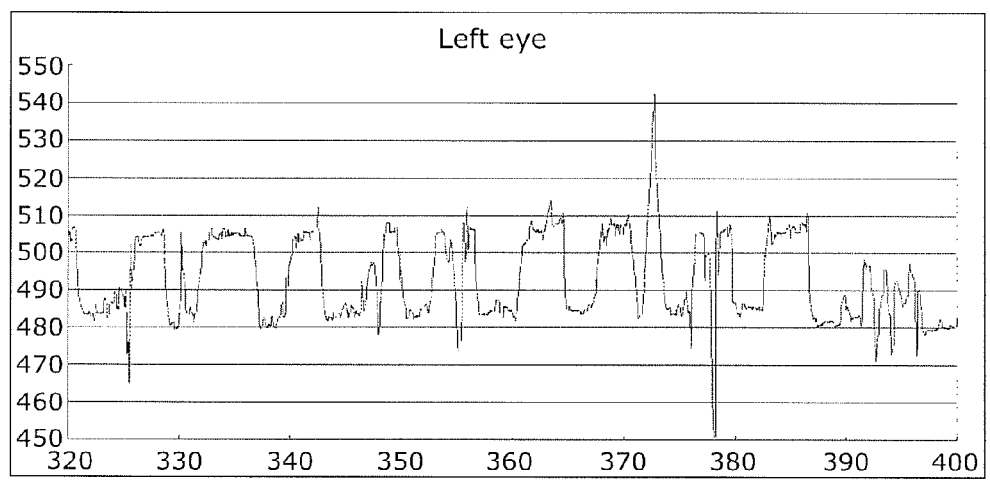
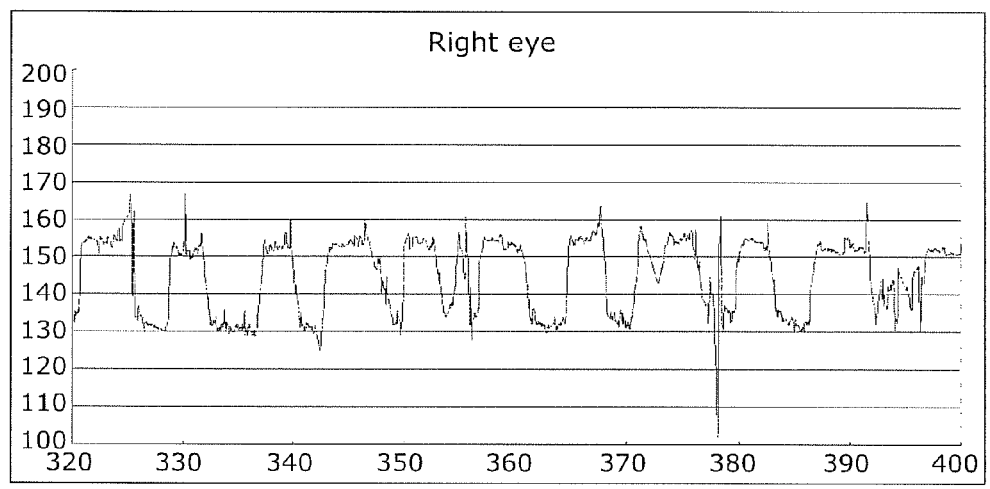

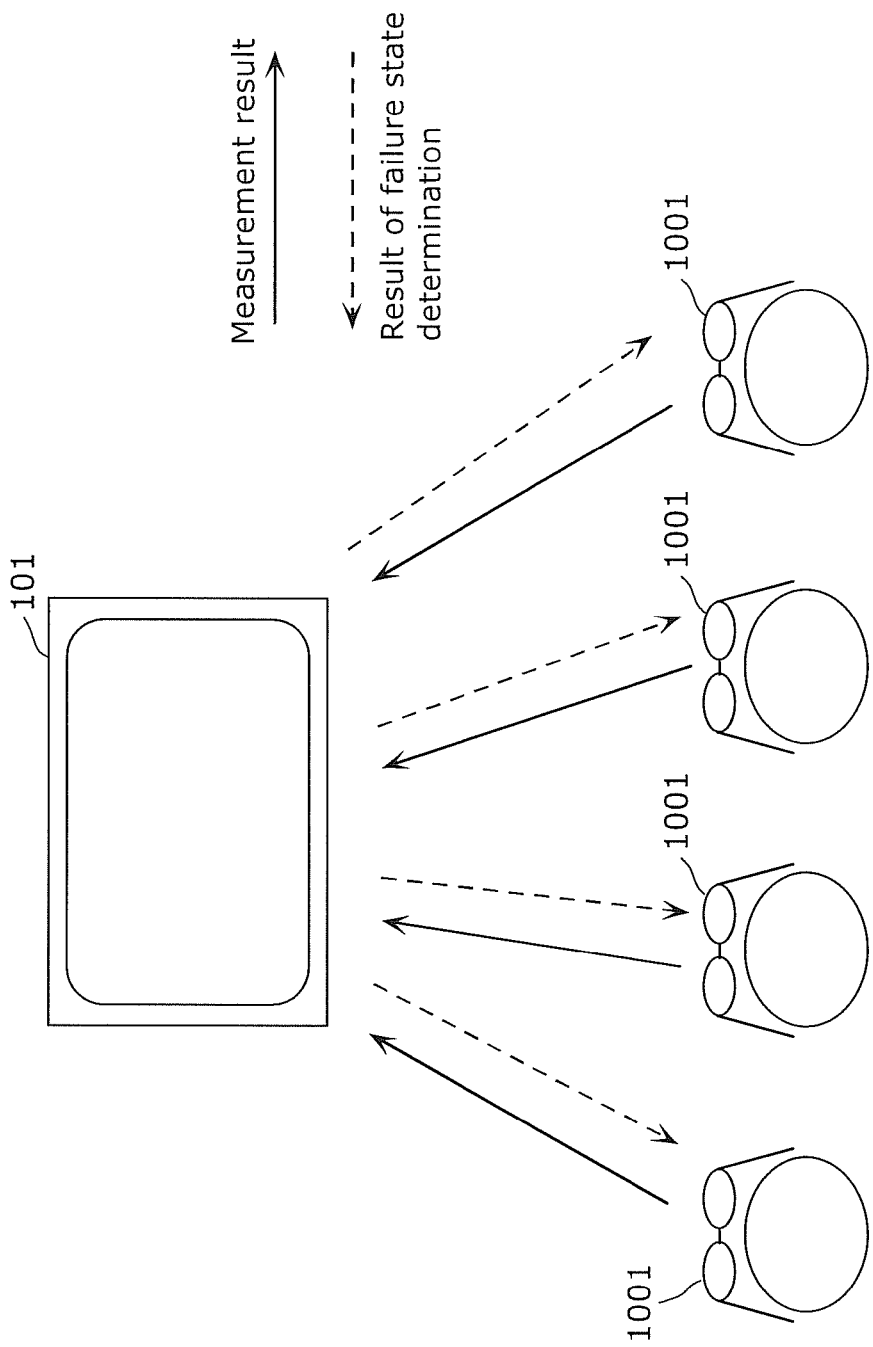

APPARATUS AND METHOD FOR PRESENTING STEREOSCOPIC VIDEO

CROSS REFERENCE TO RELATED APPLICATIONS

This is a continuation application of PCT Patent Application No. PCT/JP 2012/002344 filed on Apr. 4, 2012, designating the United States of America, which is based on and claims priority of Japanese Patent Application No. 2011-114010 filed on May 20, 2011. The entire disclosures of the above-identified applications, including the specifications, drawings and claims are incorporated herein by reference in their entirety.

FIELD

One or more exemplary embodiments disclosed herein relate generally to a stereoscopic video presenting apparatus which allows a user to view a stereoscopic video by displaying a right-eye video and a left-eye video on a screen and the user wearing eyeglasses which can control the transmittance degrees of a right-eye shutter and a left-eye shutter of the eyeglasses.

BACKGROUND ART

A method utilizing the binocular parallax is known as a method for allowing a user to view a video displayed on a flat-panel display as a stereoscopic video. This is a method which utilizes a fact that a user perceives the depth because the user's right and left eyes are positioned away from each other and videos in the left eye and right eye have different viewpoints.

The method utilizing the binocular parallax allows a user to perceive stereoscopy in the user's brain by displaying different videos to the user's right and left eyes. However, such stereoscopic view achieved by a method apart from reality may give the user visual fatigue or a sense of discomfort.

Thus, a stereoscopic video display apparatus is proposed which estimates the level of fatigue in visual function of the eyes due to fatigue of the eyes, and adjusts, in accordance with the estimated level of fatigue, the degree of stereoscopy (a value indicative of the degree of stereoscopy) (for example, see PTL 1).

In addition, a system is proposed which allows a user to view a 2D video while a 3D video is presented on a display screen, by the user switching, in eyeglasses for viewing a 3D video presented by the frame sequential method, a switch timing of liquid crystal shutters of the eyeglasses (for example, see PTL 2).

CITATION LIST

Patent Literature

[PTL 1] Japanese Unexamined Patent Application Publication No. H9-18894
[PTL 2] Japanese Utility Model No. 3159962

SUMMARY

Technical Problem

In PTL 1, the degree of stereoscopy is changed by determining the level of fatigue of the user based on an integrated value of the number of convergence eye movements of the user or a difference between the convergence eye movements of the left eye and the right eye. However, the state of the user the degree of stereoscopy for whom needs to be changed includes not only the state of fatigue caused by the convergence eye movement but also a state in which the user is originally unable to perceive the stereoscopic view and a state in which the stereoscopic video is not being viewed by a user from a correct position. Furthermore, in PTL 1, the degree of stereoscopy is adjusted in a video display unit, and thus, when the same stereoscopic video is being viewed by a plurality of users, the degrees of stereoscopy for all the users are undesirably changed. Thus, there is a problem that the degree of stereoscopy for a user who has no fatigue caused by the stereoscopic viewing is undesirably changed. In addition, in PTL 1, for example, while the level of fatigue is determined based on the integrated value of the number of convergence eye movements, the length of time of viewing the stereoscopic view whereby the fatigue is caused is different for each user, and also changes in the same user depending on the user's conditions. Thus, it is difficult to correctly determine the level of fatigue of the user by comparison with a fixed value.

In PTL 2, the stereoscopic view and the planar view are switchable in the eyeglasses, and thus even when a plurality of users is viewing the same stereoscopic video, for example, only a user who is experiencing fatigue can switch the stereoscopic video to a planar video and watch. The switching is, however, made manually and is not made unless the user has experienced fatigue. Thus, the switching cannot be made when it is better switched to the planar video while the user is unaware of fatigue. For example, the switching cannot be made in the following cases: when a user is unable to correctly perceive the stereoscopic view despite that the user is not experiencing fatigue; when the stereoscopic video is not being viewed by a user from a correct position; and when the eye movement performance has been decreased and the user is likely to experience fatigue before long.

Solution to Problem

One non-limiting and exemplary embodiment provides a stereoscopic video presenting apparatus which allows delivery of messages or a video being viewed to be switched from a stereoscopic video to a planar video, only for a user whose eye movement is in the failure state, among a plurality of users viewing the same stereoscopic video.

In one general aspect, the techniques disclosed here feature a stereoscopic video presenting apparatus for controlling opening and closing of a left-eye shutter and a right-eye shutter included in eyeglasses for stereoscopic viewing worn by a user, in synchronization with a timing to display a left-eye video and a right-eye video, thereby presenting a stereoscopic video to the user, the stereoscopic video presenting apparatus including: an eye movement measurement unit configured to measure an eye movement of each of users viewing the stereoscopic video; a user count determination unit configured to determine the number of users viewing the same stereoscopic video; and a failure state determination unit configured to, when the user count determination unit determines that the number of users viewing the same stereoscopic video is plurality, compare eye movements of a plurality of users to determine a user, among the plurality of users, whose eye movement is in the failure state.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

A stereoscopic video presenting apparatus according to one or more exemplary embodiments or features disclosed herein allows delivery of messages or a video being viewed to be switched from a stereoscopic video to a planar video, only for a user whose eye movement is in the failure state, among a plurality of users viewing the same stereoscopic video.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 is an explanatory diagram concerning a video viewed by users after the eyeglasses control according to an exemplary embodiment.

FIG. 10 is a diagram showing an example of data stored in an eye movement storage unit.

FIG. 16 is a diagram showing an example of data which is transmitted by an eye movement transmission unit.

FIG. 18 is a diagram showing an example of data which is stored in an eyeglass-specific eye movement storage unit.

FIG. 19A is a diagram showing an example of a measurement result of the eye movement of a user who can correctly view content in a stereoscopic manner.

FIG. 19B is a diagram showing an example of a measurement result of the eye movement of a user who partially fails to view content in the stereoscopic manner due to fatigue.

FIG. 26 is a diagram showing signal flows when the failure state determination device is implemented on the video display device.

DESCRIPTION OF EMBODIMENTS

Figure 1:
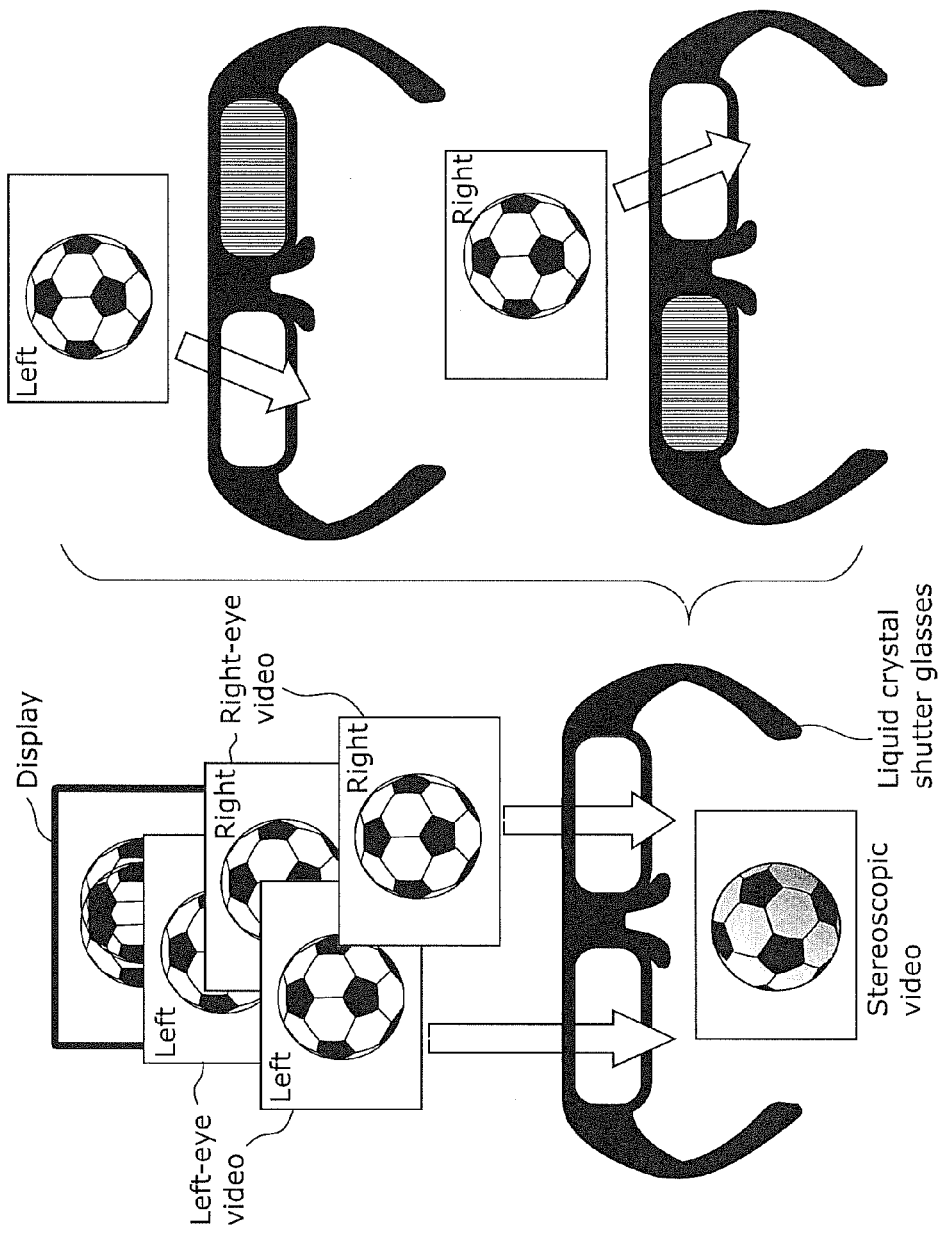
FIG. 1 is a diagram illustrating eyeglasses control principles which enables stereoscopic view.

Hereinafter, an exemplary embodiment will be described with reference to the accompanying drawings.

A stereoscopic video presenting apparatus according to an exemplary embodiment disclosed herein is a stereoscopic video presenting apparatus for presenting a stereoscopic video to a user by controlling opening and closing of a left-eye shutter and a right-eye shutter which are included in eyeglasses for stereoscopic viewing worn by the user, in synchronization with a timing to display a left-eye video and a right-eye video, the stereoscopic video presenting apparatus including: an eye movement measurement unit configured to measure an eye movement of each of users viewing the stereoscopic video; a user count determination unit configured to determine the number of users viewing a same stereoscopic video; and a failure state determination unit configured to compare, when the user count determination unit determines that the number of users viewing the same stereoscopic video is plurality, eye movements of a plurality of users to determine a user whose eye movement is in a failure state among the plurality of users.

According to the above configuration, it can be determined that a user whose eye movement is different from eye movements of the other users is a user whose eye movement is in the failure state. Thus, only for the user whose eye movement is in the failure state, among a plurality of users viewing the same stereoscopic video, delivery of messages or switching a video being viewed by the user from a stereoscopic video to a planar video is possible.

It should be noted that the stereoscopic video presenting apparatus disclosed in the exemplary embodiment is applicable not only to stereoscopic videos but also to stereoscopic images such as still images.

Moreover, the above-described stereoscopic video presenting apparatus may further include a control change unit configured to present, to the user determined to be in the failure state by the failure state determination unit, only one of the right-eye video and the left-eye video by changing a control method for opening and closing of the left-eye shutter and the right-eye shutter of the eyeglasses worn by the user to a control method for concurrent opening and closing of the left-eye shutter and the right-eye shutter.

According to the above configuration, the video being viewed by the user who is in the failure state can be changed from the stereoscopic video to the planar video while the video being viewed by the user who is not in the failure state remains the stereoscopic video.

Moreover, the stereoscopic video presenting apparatus may further include a control timing determination unit configured to cause the control change unit to change the control method for opening and closing of the left-eye shutter and the right-eye shutter of the eyeglasses worn by the user determined to be in the failure state by the failure state determination unit to the control method for concurrent opening and closing of the left-eye shutter and the right-eye shutter, at a timing at which an amount of convergence of the eye movement of the user is smaller than a predetermined threshold amount of convergence.

According to the above configuration, at a timing at which the amount of convergence of the eye movement is smaller than the predetermined threshold amount of convergence, the video being viewed by the user who is in the failure state can be changed from the stereoscopic video to the planar video. This allows the stereoscopic video to be changed to the planar video without making the user feel a sense of discomfort.

Moreover, the failure state determination unit may compare amounts of convergence of the eye movements of the plurality of users in a predetermined period to determine, as a user in the failure state who is unable to perceive stereoscopic view, a user whose amount of convergence is smaller than the amounts of convergence of the eye movements of no less than a predetermined number of other users.

When only one user is unable to perceive the stereoscopic view despite that the other users are able to correctly perceive the stereoscopic view, the amount of convergence of the eye movement of the user is smaller than the amounts of convergence of the eye movements of the other users. Thus, according to the above configuration, the state in which the user is unable to correctly perceive the stereoscopic view can be determined to be the failure state of the user.

Moreover, the failure state determination unit may compare the amounts of convergence of the eye movements of the plurality of users at the same time to determine, as a user in the failure state who is too close to a display screen showing the right-eye video and the left-eye video, a user whose amount of convergence is greater than the amounts of convergence of the eye movements of any other users by a predetermined value or greater.

When the user is at a position too close to the display screen as compared to a proper viewing position, the amount of convergence is large. Thus, according to the above configuration, the state in which the user is too close to the display screen can be determined to be the failure state of the user.

Moreover, the failure state determination unit may compare integrated values of the amounts of convergence of the eye movements of the plurality of users in a same period to determine, as a user in the failure state in which the user is fatigued, a user for whom the integrated value is smaller than the integrated values for any other users by a predetermined value or greater.

When the user is unable to correctly perceive the stereoscopic view, typically, the amounts of convergence of the eye movement of the user ends up being partially smaller than the amounts of convergence of the eye movement of the user who is able to correctly perceive the stereoscopic view. Thus, according to the above configuration, the state in which the user is fatigued can be determined to be the failure state of the user.

Moreover, the failure state determination unit may compare reaction rates of the eye movements of the plurality of users in a same period to determine, as a user in the failure state in which the user is fatigued, a user for whom the reaction rate is smaller than the reaction rates of any other users by a predetermined value or greater.

When the user is unable to correctly perceive the stereoscopic view, typically, the reaction rate of the eye movement ends up being smaller than the reaction rate of the eye movement when the user is able to correctly perceive the stereoscopic view. Thus, according to the above configuration, the state in which the user is fatigued can be determined to be the failure state of the user.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Examples of an apparatus which presents a stereoscopic video to a user include an apparatus, as shown in FIG. 1, in which a right-eye video and a left-eye video are alternately displayed on a display (hereinafter, such videos will be described as "stereoscopic video"), and liquid crystal shutter glasses (hereinafter, sometimes referred to as "eyeglasses") for stereoscopic viewing alternately pass the right-eye video and the left-eye video through a right shutter and a left shutter, respectively, in synchronization with the display of the stereoscopic video, thereby presenting, to a user, videos corresponding to the left and right eyes of the user (the frame sequential method). In other words, a shutter synchronization control of the shutter glasses is performed so that the left-eye video is displayed to the left eye and the right-eye video is displayed to the right eye.

Figure 2:
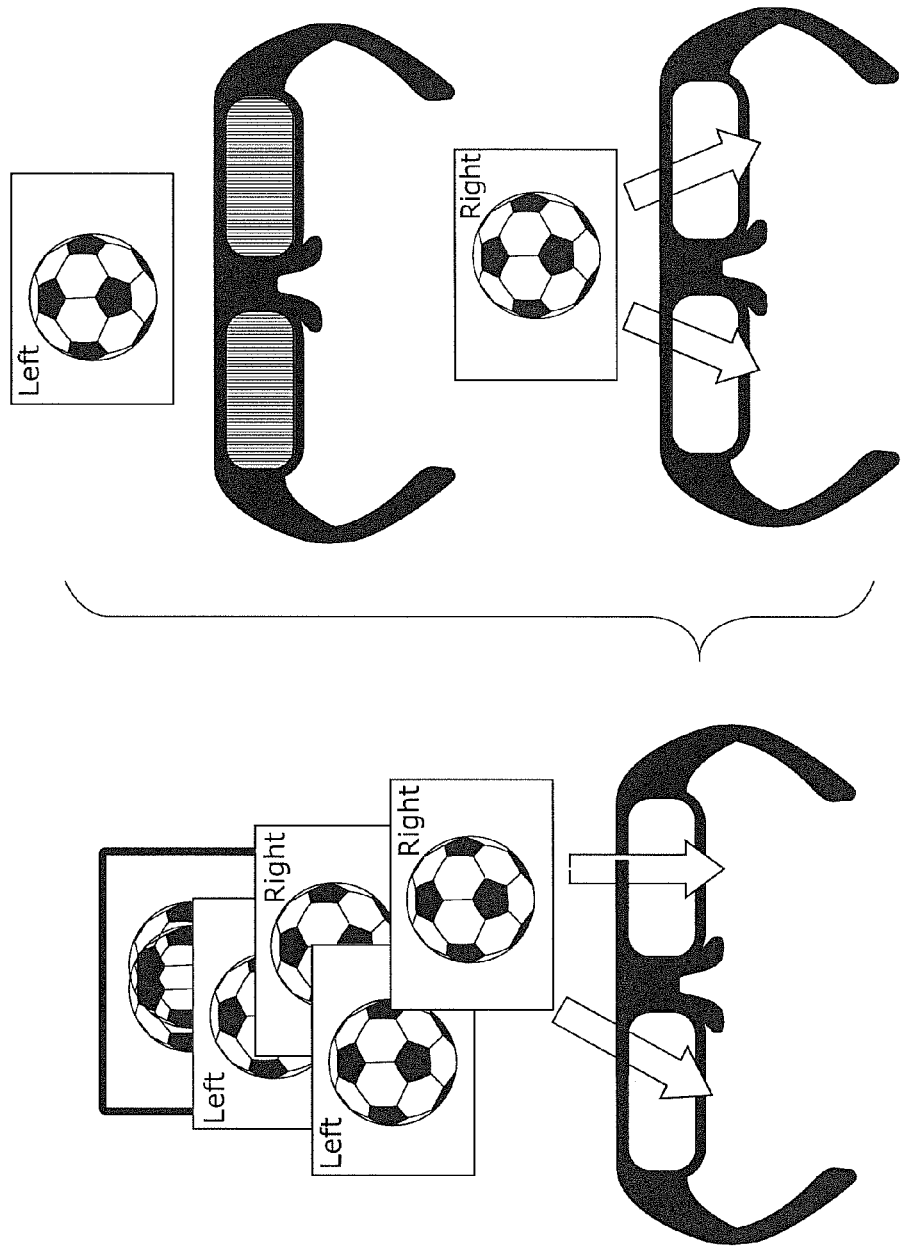
FIG. 2 is a diagram illustrating eyeglasses control principles which enables the stereoscopic view to be switched to the planar view.

The stereoscopic video presenting apparatus according to the present embodiment switches from stereoscopic video viewing to planar video viewing by controlling, for example, the liquid crystal shutter glasses so as to display to the eyes either the right-eye video or the left-eye video as shown in FIG. 2 when it is determined, in such a stereoscopic video device, that (i) the user is fatigued, (ii) there is a failure in a viewing position or videos and the user may be fatigued by the stereoscopic view, or (iii) the user is unable to perceive the stereoscopic view despite that the stereoscopic video is displayed (hereinafter, described as "determined to be in the failure state").

Here, even when the same stereoscopic view is perceived by a plurality of users, how the stereoscopic view appears or the level of fatigue depends on a user. Thus, in the present embodiment, when a plurality of users is viewing the stereoscopic video using the eyeglasses, the eye movements of the users are compared with each other. A user in the failure state is identified based on a comparison result, and, for example, the above-mentioned control or message notification is performed only on the eyeglasses worn by a user determined to be in the failure state. Thus, the stereoscopic view of the other users who are viewing the same stereoscopic video and not in the failure state are not interfered. For example, it is assumed that seven users a user A, a user B, a user C, a user D, a user E, a user F, and a user G are viewing a 3D video in a situation as illustrated in FIG. 3. Here, when it is determined that the user A and the user F are detected as being fatigued due to viewing the 3D video, a 2D video is presented only to the user A and the user F by performing the shutter control on the eyeglasses worn by the user A and the user F. This allows the 2D video to be presented to only the user A and the user F, without changing the 3D video viewing environment of the remaining five users.

Figure 4A:
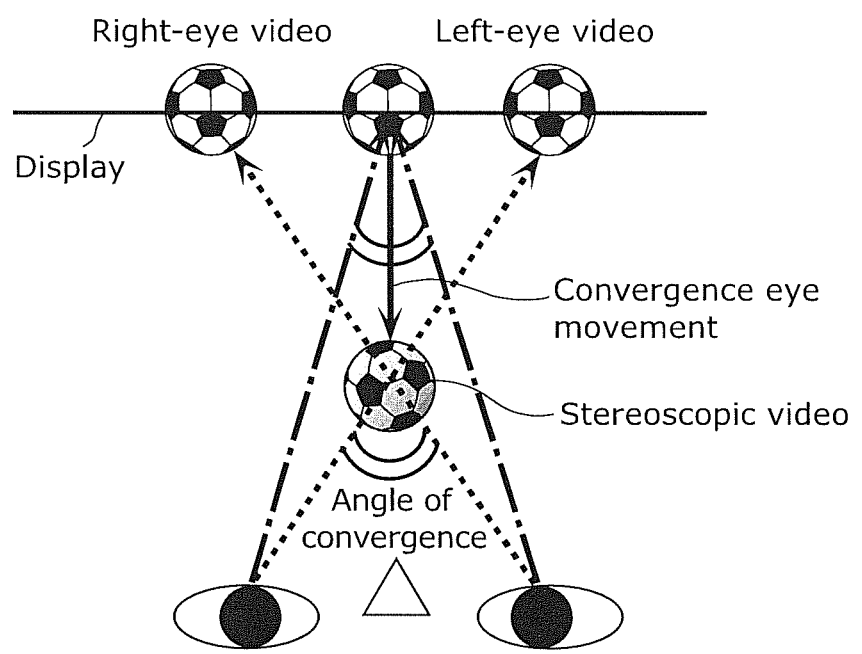
FIG. 4A is a diagram illustrating an angle of convergence in an eye movement of a user.
Figure 4B:
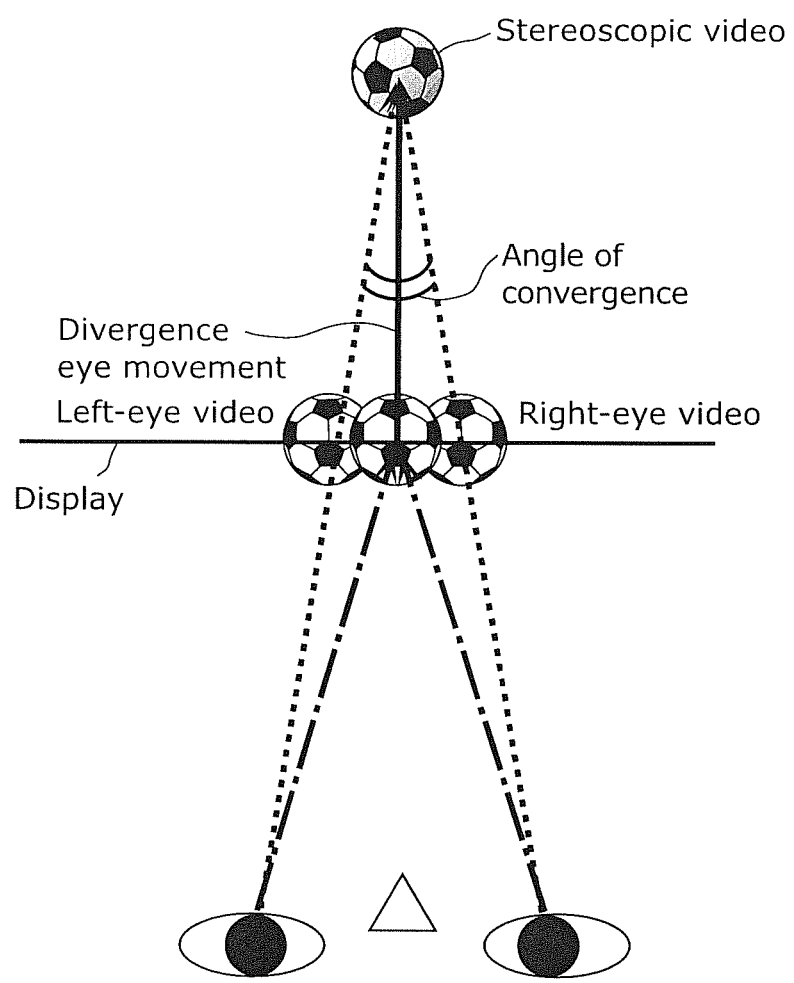
FIG. 4B is a diagram illustrating an angle of convergence in an eye movement of the user.

Here, the eye movement of a user viewing the stereoscopic video will briefly be described. When different videos are displayed to the left and right eyes using the stereoscopic video as described above, the user is allowed to perceive the degree of stereoscopy in terms of depth by being allowed to view different videos in the horizontal direction. Here, as shown in FIG. 4A, the greater a distance (disparity) between an object rightward away from the left eye in the left-eye video and the object leftward away from the right eye in the right-eye video, the closer the displayed object appears to the user, and the eyes of the user at the time rotate toward each other. This movement is called convergence eye movement, and an angle between viewing directions of the eyes is called an angle of convergence. The angle of convergence is an amount indicating how inwardly the pupils of the left and right eyes are positioned toward each other (relative to a state in which the left and right eyes are looking at the distance at infinity), and, as can be seen from FIG. 4A, the closer the three-dimensionally perceived location of an object is to the eyes, the greater the angle of convergence is. On the other hand, as the three-dimensionally perceived location of an object stereoscopically displayed as shown in FIG. 4B is away from the eyes, the pupils of the eyes of the user rotate away from each other. This movement is called divergence eye movement. The angle of convergence is small at the divergence eye movement.

Figure 5:
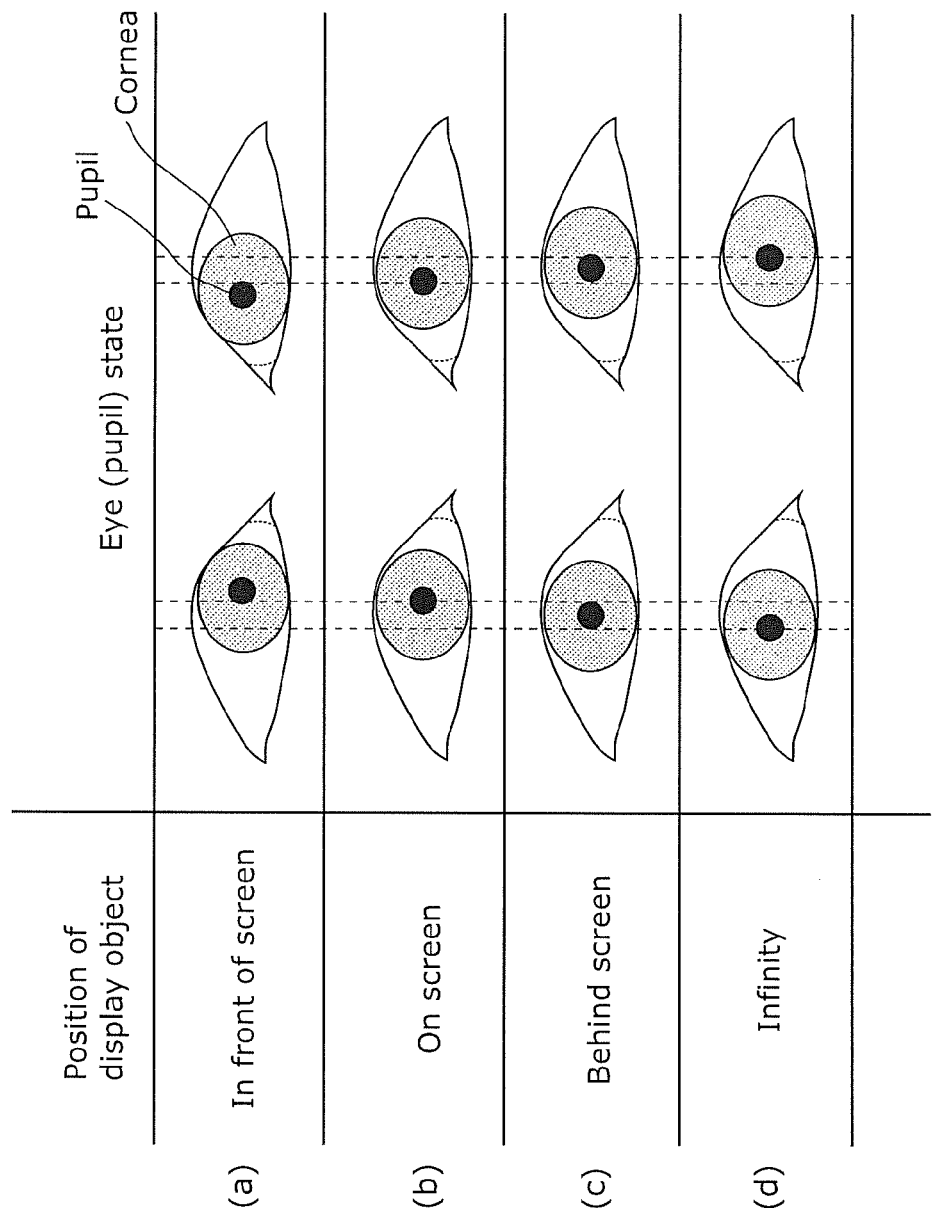
FIG. 5 is a diagram showing states of the eyes when positions of a display object are different.

FIG. 5 shows an example of illustration depicting eye states when positions of the display object are different. As shown in (d) of FIG. 5, the eyes move away from each other the most when the eyes look at a distance at infinity, and the pupillary distance (a distance between the centers of pupils of the eyes) is the longest. As shown in (a) of FIG. 5, when the user views the stereoscopic video perceived as being in front of the screen, the eyes move toward each other as compared to when the user views the planar video, and thus the pupillary distance is short. Meanwhile, as shown in (c) of FIG. 5, when the user views the stereoscopic video perceived as being behind the screen, the eyes move away from each other as compared to when the user views the planar video, and thus the pupillary distance is long.

In the present embodiment, the failure state of each user is determined by comparing the angles of convergence of the eye movements of a plurality of users, provided that the amount of convergence correlated to the angle of convergence is used in the present embodiment without directly calculating the angle of convergence. Here, as with the case of the angle of convergence, the amount of convergence is an amount indicating how much the convergence eye movement is caused as compared to the amount of convergence of the eyes in a state in which the eyes look at the distance at infinity or the user is viewing an object on the screen. In other words, the amount of convergence is an amount indicating how short the pupillary distance is as compared to the pupillary distance in the state described above, and the unit of the amount of convergence depends on a method whereby the eye movement is measured.

Hereinafter, certain exemplary embodiments are described in greater detail with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Figure 6:
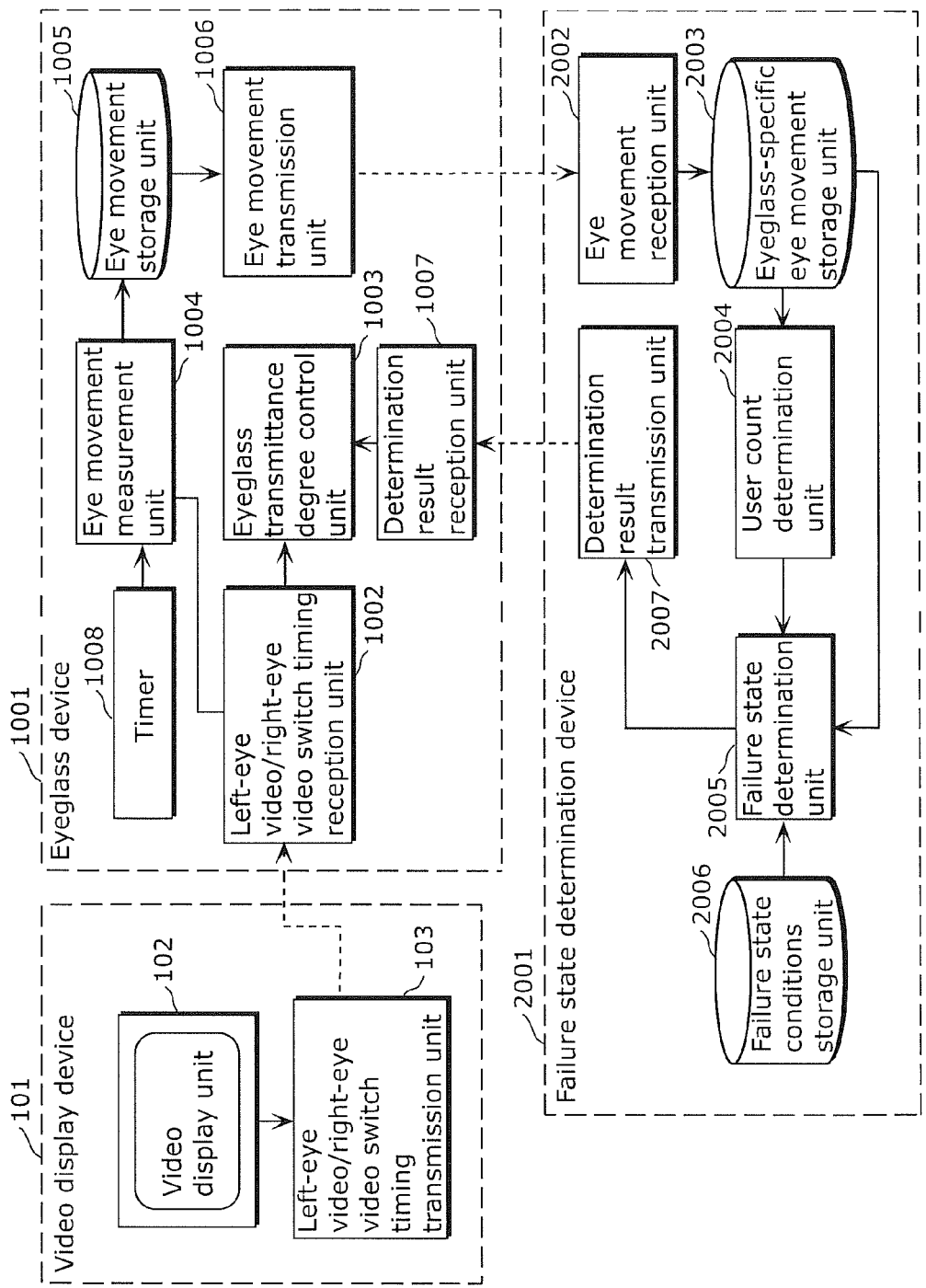
FIG. 6 is a block diagram showing functional configurations of a video display device, an eyeglass device, and a failure state determination device which are included in a stereoscopic video presenting apparatus according to the exemplary embodiment.

FIG. 6 is a block diagram showing a functional configuration of the stereoscopic video presenting apparatus according to the exemplary embodiment.

The stereoscopic video presenting apparatus is an apparatus which presents a stereoscopic video to a user, and includes a video display device 101, an eyeglass device 1001, and a failure state determination device 2001.

The video display device 101 includes a video display unit 102 typified by a display, and a left-eye video/right-eye video switch timing transmission unit 103 which transmits, to the eyeglass device 1001, a switch timing signal indicating a timing to switch between a left-eye video and a right-eye video displayed on the video display unit 102. The left-eye video/right-eye video switch timing transmission unit 103 includes an infrared emitter, for example.

Next, components included in the eyeglass device 1001 will be described. The eyeglass device 1001 includes a left-eye video/right-eye video switch timing reception unit 1002, an eyeglass transmittance degree control unit 1003, an eye movement measurement unit 1004, an eye movement storage unit 1005, an eye movement transmission unit 1006, a determination result reception unit 1007, and a timer 1008.

The left-eye video/right-eye video switch timing reception unit 1002 receives a switch timing signal which is for switching between the left-eye video and the right-eye video and transmitted from the left-eye video/right-eye video switch timing transmission unit 103. The eyeglass transmittance degree control unit 1003 controls transmittance degrees of the left shutter and the right shutter of the eyeglasses, in response to the switch timing signal which is for switching between the left-eye video and the right-eye video and received by the left-eye video/right-eye video switch timing reception unit. The eyeglasses are liquid crystal shutters included in the eyeglass device 1001 and disposed in front of the user's eyes. The eye movement measurement unit 1004 measures the eye movement of the user and writes in the eye movement storage unit 1005 a measurement result together with the time of measurement measured by the timer 1008. The eye movement transmission unit 1006 transmits to the failure state determination device 2001 the measurement result together with the time of measurement. The determination result reception unit 1007 receives the failure state determination result determined by a failure state determination unit 2005. When it is determined, in the received result, that the user is in the failure state, the eyeglass transmittance degree control unit 1003 changes the method of controlling the transmittance degrees of the eyeglasses. This allows the video being presented to the user to be changed from the stereoscopic video to the planar video.

Next, components included in the failure state determination device 2001 will be described. The failure state determination device 2001 includes an eye movement reception unit 2002, and an eyeglass-specific eye movement storage unit 2003, a user count determination unit 2004, a failure state determination unit 2005, a failure state conditions storage unit 2006, and a determination result transmission unit 2007.

The eye movement reception unit 2002 receives the measurement result of the eye movement and the time of measurement from each eyeglass device 1001, and writes the received data to the eyeglass-specific eye movement storage unit 2003. The user count determination unit 2004 determines the number of users who are currently viewing the same content, based on the measurement results of the eye movements for different eyeglasses stored in the eyeglass-specific eye movement storage unit 2003, and transmits the result to the failure state determination unit 2005. The failure state conditions storage unit 2006 stores the amounts of convergence or the angles of convergence of the eye movements of possible users in playback time units of the content. When there is a plurality of users who are currently viewing the same content, the failure state determination unit 2005 compares the measurement results of the eye movements of the plurality of users stored in the eyeglass-specific eye movement storage unit 2003 to determine whether each user is in the failure state. When there is one user currently viewing the content, the failure state determination unit 2005 compares between information stored in the failure state conditions storage unit 2006 and the eye movement of the user stored in the eyeglass-specific eye movement storage unit 2003 to determine whether the user is in the failure state. The failure state determination unit 2005 outputs a determination result to the determination result transmission unit 2007. The determination result transmission unit 2007 transmits the determination result to each eyeglass device 1001.

Figure 7:
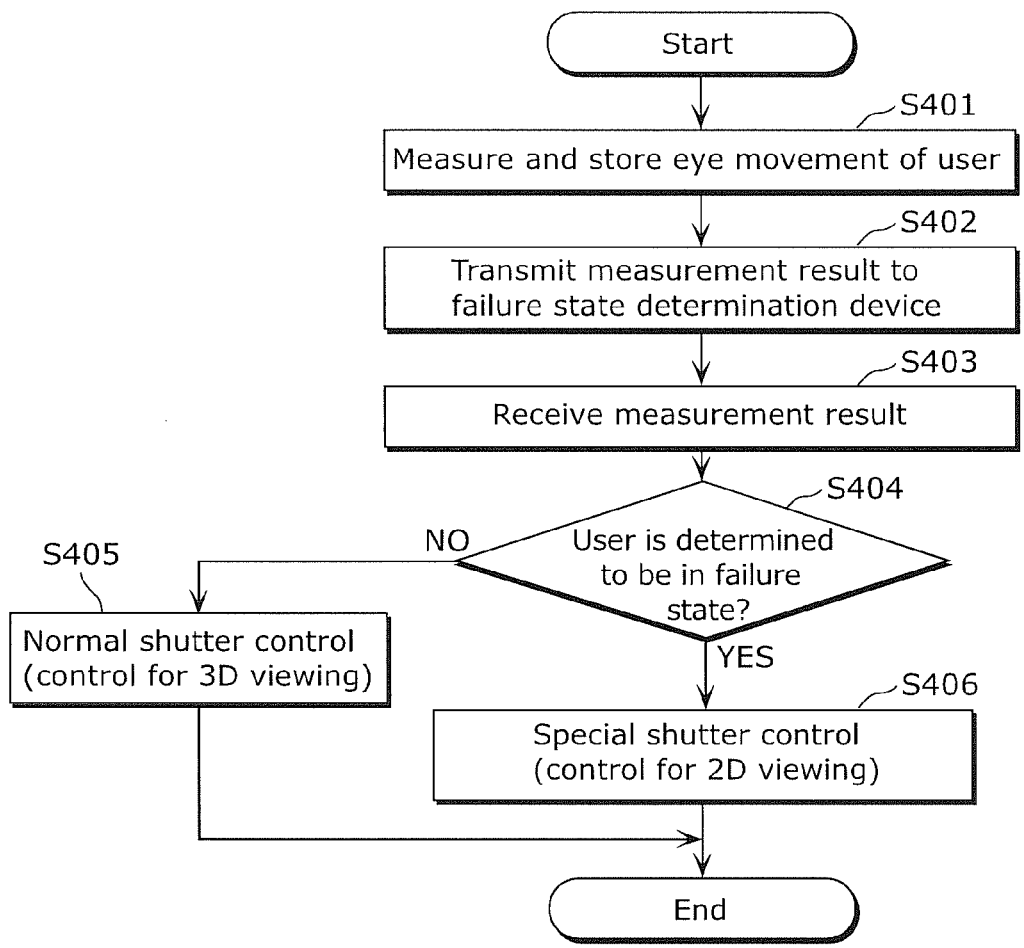
FIG. 7 is a flowchart illustrating basic processing of the eyeglass device according to the exemplary embodiment.

First, processing of the eyeglass device 1001 will be described with reference to a flowchart illustrated in FIG. 7. The flowchart illustrated in FIG. 7 shows processing flow from when the eye movement of the user is measured to when the next measurement is to be conducted, and this processing is repeatedly performed while the eye movement of the user is being measured.

Figure 8A:
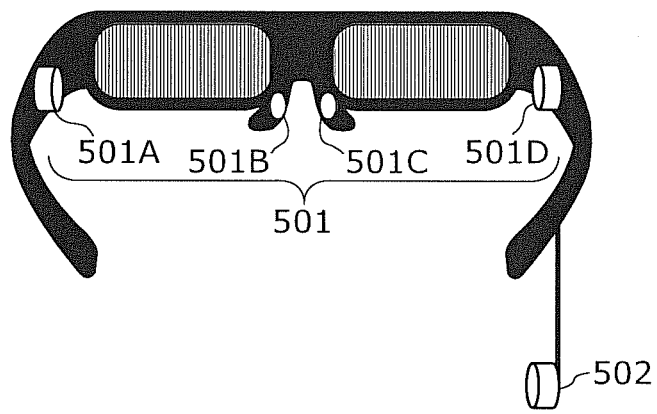
FIG. 8A is a diagram showing an example of eyeglasses for stereoscopic viewing which are used for measuring electrooculograms.
Figure 8B:
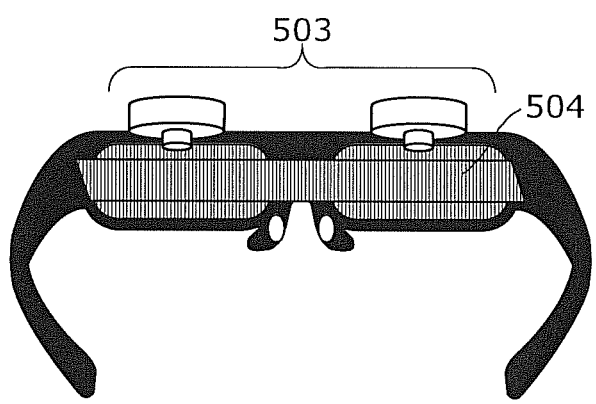
FIG. 8B is a diagram showing an example of eyeglasses for stereoscopic viewing which are used for capturing images of the eyes.
Figure 8C:
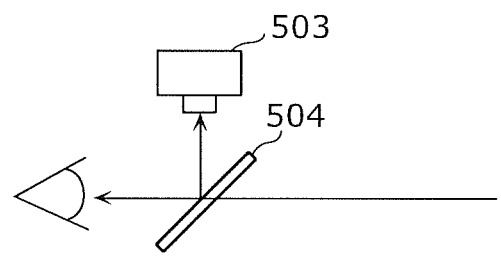
FIG. 8C shows a side view of FIG. 8B without the eyeglasses.

In step S401, the eye movement measurement unit 1004 measures the eye movement of the user at predetermined intervals. Examples of the method of measuring the eye movement by the eye movement measurement unit 1004 include a method to measure electrooculograms using electrodes as a sensor and measure the potential variations, and a method to capture images of the eyes using a camera as the sensor. FIG. 8A to FIG. 8C each show an example overview of eyeglasses for stereoscopic viewing which has the sensor such as the electrodes or the camera attached thereto and enables to measure the eye movement.

FIG. 8A shows the eyeglasses for stereoscopic viewing which are used for measuring the electrooculograms, and electrodes 501 and 502 for measuring the electrooculograms are provided on a frame portion of the eyeglasses. The electrodes 501 are electrodes for measuring the potentials of the eyes, and include four electrodes which are an electrode 501A, an electrode 501B, an electrode 501C, and an electrode 501D. The electrode 502 is a ground electrode. Changes in potential of the eyes are measured by a potential difference between the electrodes 501 and the electrode 502. FIG. 8B shows eyeglasses for stereoscopic viewing which are used for capturing images of the eyes, and include a camera 503 and a half mirror 504. An image of the eyes of the user reflected in the half mirror 504 is captured by the camera 503 attached to the upper portion of the eyeglasses. It should be noted that FIG. 8C shows a side view of FIG. 8B without the eyeglasses. As shown in FIG. 8C, videos are delivered to the user's eyes through the half mirror while the video of the user's eyes reflected in the half mirror enters the camera 503.

Figure 9:
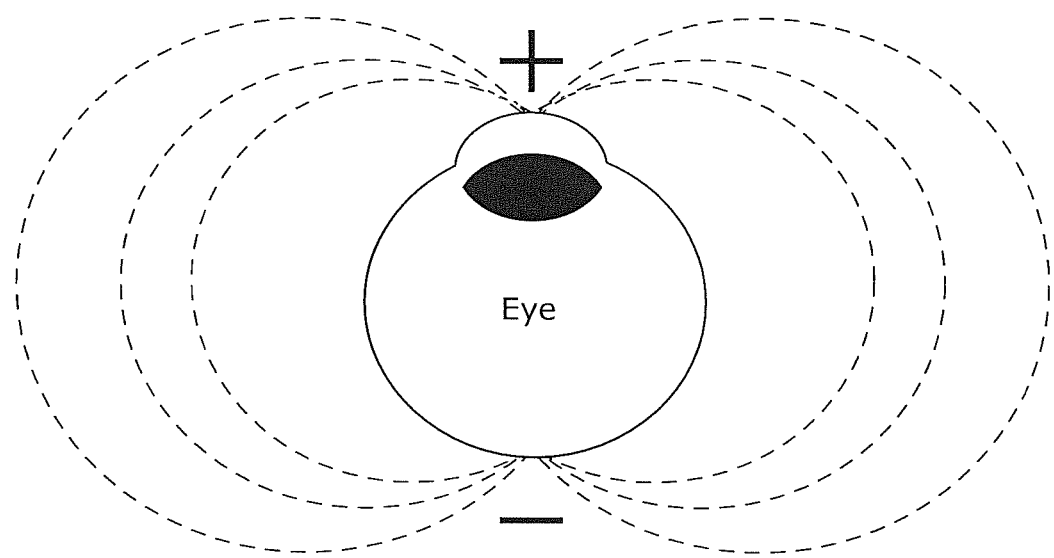
FIG. 9 is a diagram illustrating the eye as a battery model.

First, an example will be described in which the eye movement is measured by measuring the electrooculograms. As shown in FIG. 9, the eyes of man can be considered as a weak battery having cornea and retina as positive and negative, respectively. Thus, measuring the electrooculograms enables to measure the eye movement.

The eye movement measurement unit 1004 stores, in the eye movement storage unit 1005, a measurement result of the change in potential of each electrode, using, for example, the eyeglasses as shown in FIG. 8A. An example of information on the measurement result of the eye movement stored in the eye movement storage unit 1005 is shown in FIG. 10. The information on the measurement result of the eye movement is information in association with seven items of information which are an item 601, an item 602, an item 603, an item 604, an item 605, an item 606, and an item 607. The item 601 indicates date and time of the measurement. The items 602 to 605 are measurement results obtained by measuring potentials using the electrodes 501A to 501D, respectively. It should be noted that the items 602 to 605 are each a difference value between the ground electrode and each of the electrodes 501. The item 606 indicates a value obtained by subtracting a value of the item 603 from a value of the item 602. The movement of the left eye can be seen from changes in the value. The item 607 indicates a value obtained by subtracting a value of the item 605 from a value of the item 604. The movement of the right eye can be seen from a change in the value.

It should be noted that, in the embodiment, the electrodes are disposed interposing the eyes in the horizontal direction as shown in FIG. 8A so that a potential difference in the horizontal direction relative to the eyes can be measured, to measure the convergence eye movement required for viewing the stereoscopic video. Disposing the electrodes in such a manner allows, for example, the measurement of the eye movement of the left eye in the horizontal direction by measuring a potential difference between the ground electrode and each of the electrode 501B and the electrode 501A.

Figure 11:
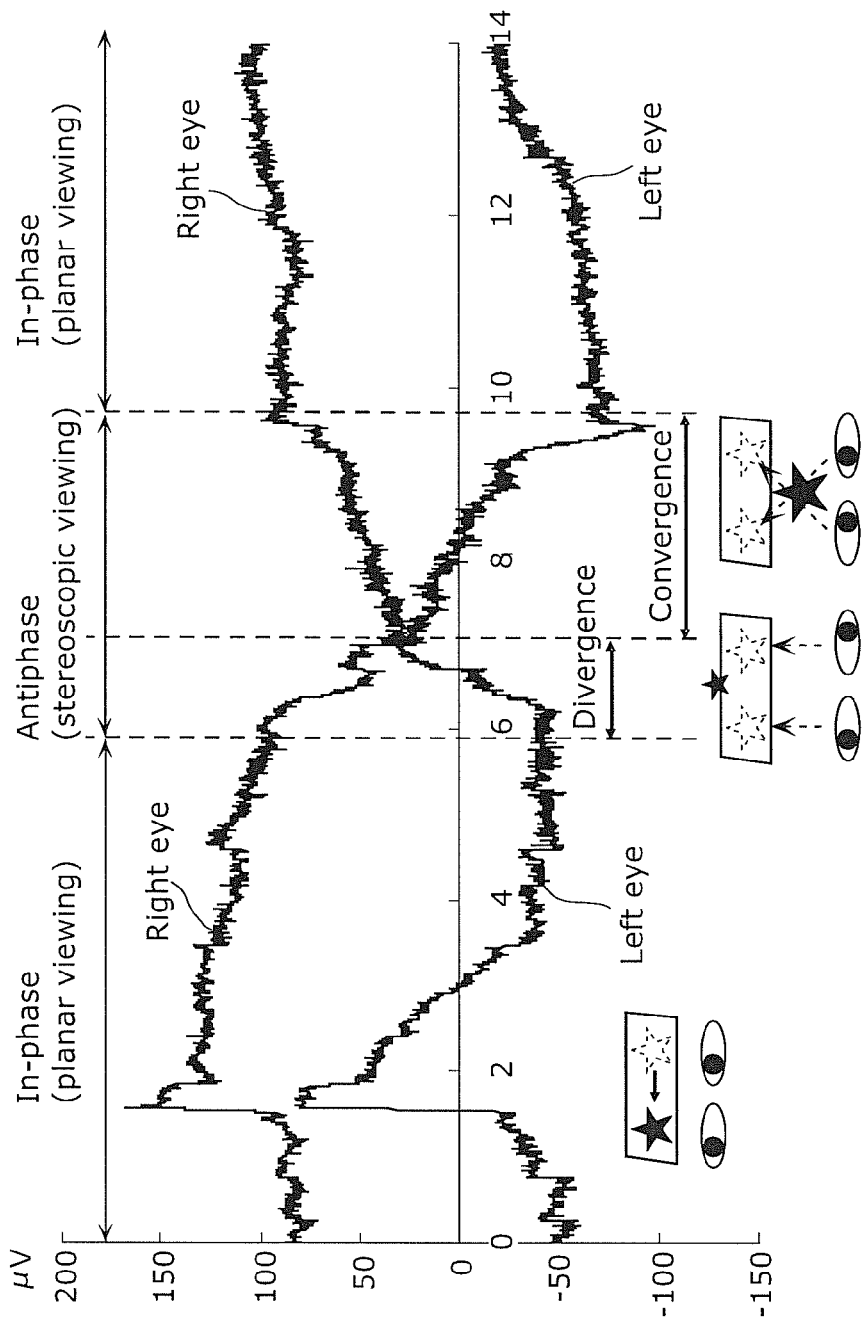
FIG. 11 is a diagram showing an example of data obtained by measuring the electrooculograms.

FIG. 11 shows an example of the measurement result of the electrooculograms. It can be seen from FIG. 11 that when the user is viewing on a plane, a potential difference between the right eye and the left eye depicts in-phase relationship while when the user is viewing the stereoscopic video, the potential difference between the right eye and the left eye depicts antiphase relationship. In addition, it can be seen, from the measurement result, whether the eye movement is of the divergence eye movement or of the convergence eye movement, based on the inverse relationship between the electrooculograms variations of the left and right eyes.

Figure 12:
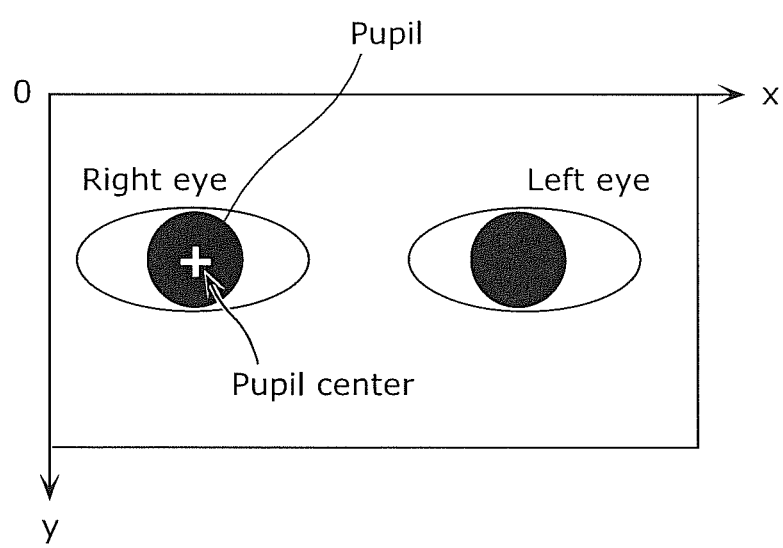
FIG. 12 is a diagram showing an example of an image captured by a camera attached to the eyeglasses.

Next, an example will be described in which the eye movement is measured by measuring an eye image. The eye movement measurement unit 1004 extracts positions of pupil centers by, for example, performing image processing on the image of the user's eyes captured by the camera 503 provided on the eyeglasses as shown in FIG. 8B and FIG. 8C. The eye movement measurement unit 1004 stores coordinates of the extracted pupil centers in the eye movement storage unit 1005. FIG. 12 is a diagram showing an example of the eye image captured by the camera 503, and from the eye image, the eye movement measurement unit 1004 calculates the coordinates of the pupil centers of the right eye and the left eye.

Figure 13:
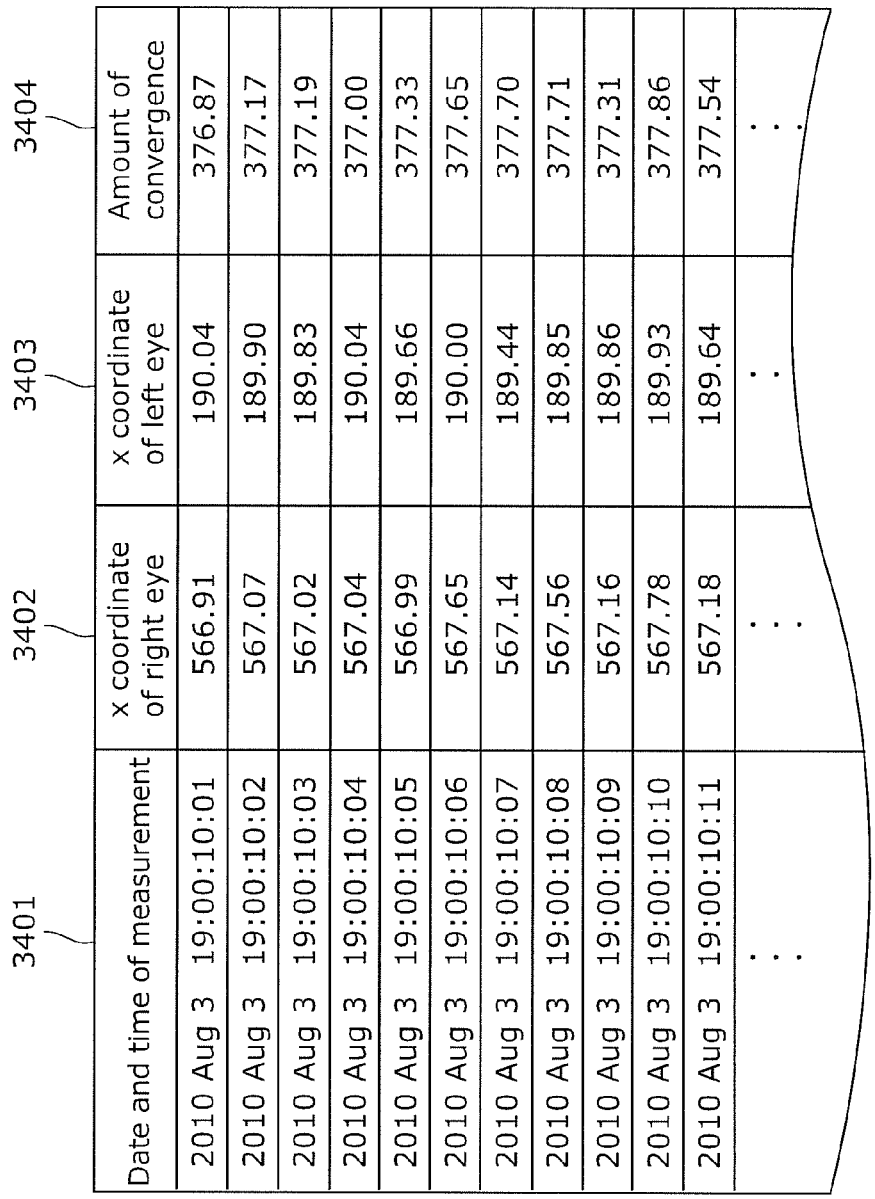
FIG. 13 is a diagram showing an example of result information on eye movement calculation.
Figure 14:
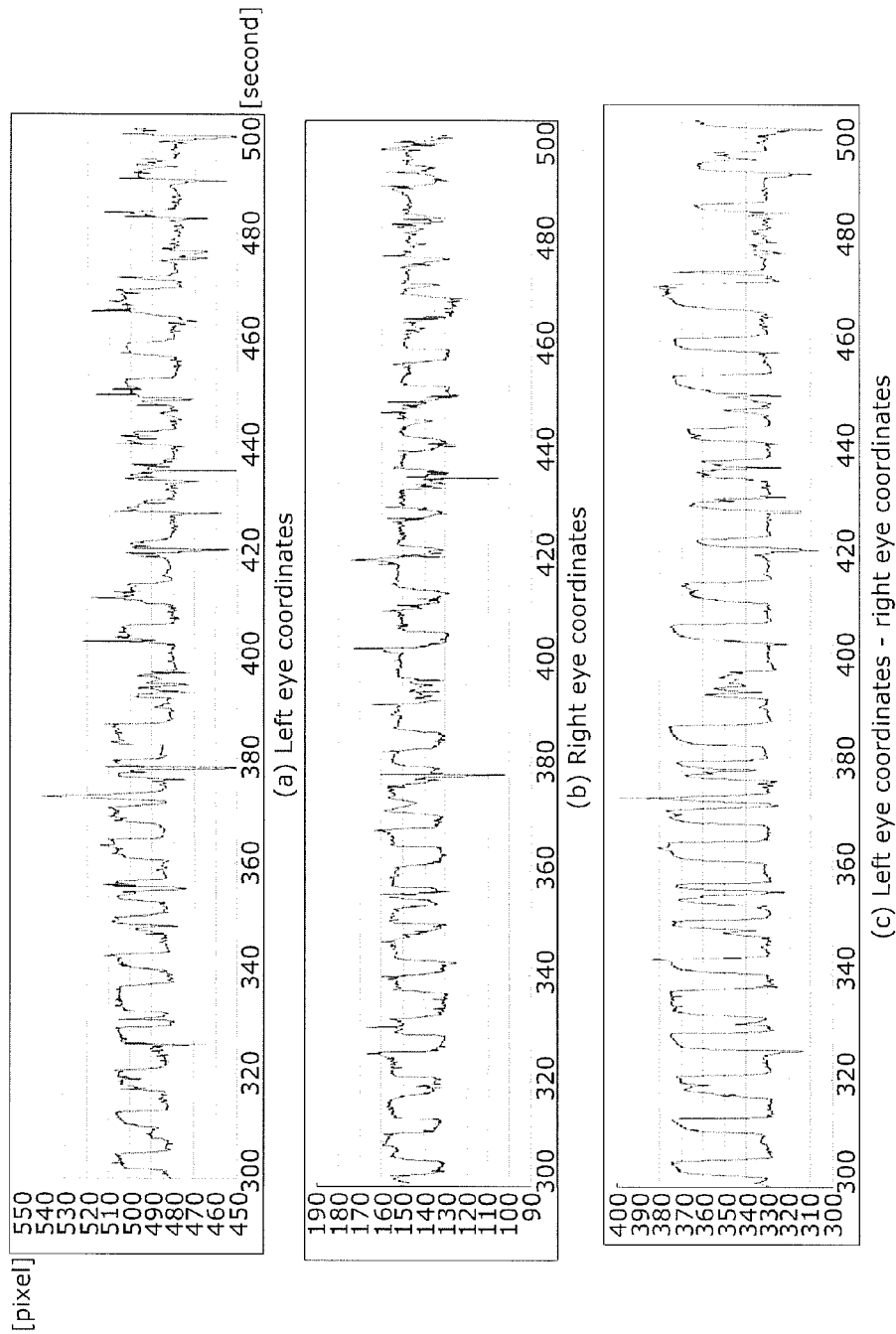
FIG. 14 is a graph showing changes in pupil center positions of the user's eyes over time and a change in amount of convergence over time.
Figure 15:
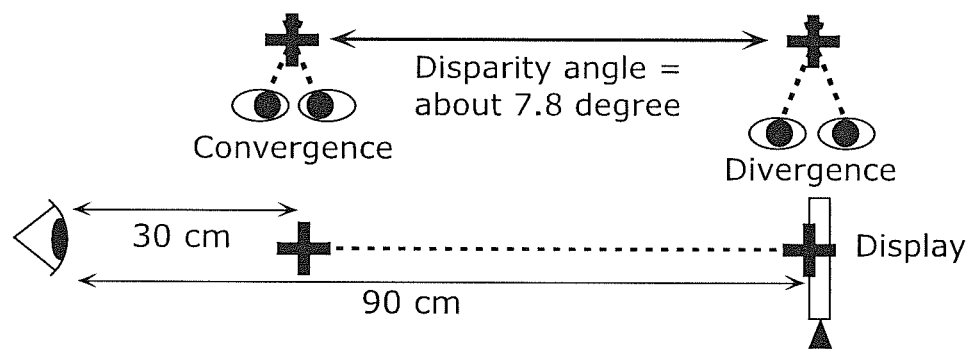
FIG. 15 is a diagram illustrating an experiment performed on a user.

An example of the result information on the eye movement calculation stored in the eye movement storage unit 1005 is shown in FIG. 13. The result information on the eye movement calculation is information in association with four items of information which are an item 3401, an item 3402, an item 3403, and an item 3404. The item 3401 indicates date and time of the measurement. The item 3402 indicates an x coordinate (in pixel units) of the pupil center coordinates of the right eye. The item 3403 indicates an x coordinate (in pixel units) of the pupil center coordinates of the left eye. The item 3404 indicates the amount of convergence. The amount of convergence is a value (in pixel units) obtained by subtracting a value of the item 3402 from a value of the item 3403. FIG. 14 shows a result obtained by graphing changes in pupil center positions of the user's eyes over time and changes in the amount of convergence over time when an experiment is performed in which a mark displayed on a screen (display) and a mark displayed forward a predetermined distance from the screen as shown in FIG. 15 are alternately shown to the user. Specifically describing the experiment, a cross mark is presented alternately on the screen, which is 90 cm ahead of the user, and at a position cm forward from the screen at 3 second to 5 second intervals for 900 seconds, and the change in the pupil center positions of the eyes over time and the change in the amount of convergence over time then is obtained. Parts (a) and (b) of FIG. 14 show changes in pupil center coordinates of the left eye and the right eye, respectively, over time, and (c) of FIG. 14 indicates the change in the amount of convergence over time obtained by subtracting the pupil center coordinates of the right eye ((b) of FIG. 14) from the pupil center coordinates of the left eye ((a) of FIG. 14) at the same time. In the amount of convergence shown in (c) of FIG. 14, a value being positioned at about a pixel 375 indicates that the user is looking at the mark displayed on the screen, and a value of the amount of convergence being positioned at about a pixel 330 indicates that the user is looking at the mark displayed at the position forward the predetermined distance from the screen.

It should be noted that while, in the present embodiment, the failure state of the user is determined based on the amounts of convergence as shown in (c) of FIG. 14, the amount of convergence has a value as described above even when the user is looking on the screen. Thus, to understand, based on the amounts of convergence, how much an object projects from the screen or how much the object has depth, it is necessary to know, in advance, the amount of convergence when the user looks at the object on the screen.

Thus, in this step, the amount of convergence (hereinafter, described as "reference amount of convergence") of the eye movement of the user when viewing the object on the screen in the stereoscopic video or viewing the planar video is measured.

To determine whether the user is viewing the planar video instead of the stereoscopic video, for example, determination is used as to whether signals for switching the transmittance degrees of the left shutter and the right shutter of the eyeglasses is transmitted from the left-eye video/right-eye video switch timing transmission unit 103 of the video display device 101 while the stereoscopic video is being displayed. The eye movement measurement unit 1004 calculates a reference amount of convergence, based on the measurement result of the amounts of convergence during a time at which the eye movement measurement unit 1004 is not receiving the switch timing signal transmitted from the left-eye video/right-eye video switch timing reception unit 1002. For example, an average value of the amounts of convergence during the time may be calculated as the reference amount of convergence. It should be noted that while the switch timing signal for switching between the left-eye video and the right-eye video is used in the above, a signal indicating whether the video currently being displayed on the video display device 101 is whether the stereoscopic video or the planar video may separately be transmitted to the eyeglass device 1001. The eye movement measurement unit 1004 calculates the reference amount of convergence in the same manner as described above, based on the measurement result of the amounts of convergence during a time at which the signal indicating the planar video is being received.

It should be noted that a difference value obtained by subtracting the reference amount of convergence calculated as described above from the measured amount of convergence may be stored as the amount of convergence in the eye movement storage unit 1005 or transmitted from the eye movement transmission unit 1006, to be used for determining the failure state.

In step S402, the eye movement transmission unit 1006 transmits the measurement result to the failure state determination device 2001. Here, an ID set for each eyeglass device 1001 is also transmitted in addition to the measured eye movement.

FIG. 16 is a diagram showing an example of data which is transmitted by the eye movement transmission unit 1006. The eye movement transmission unit 1006 transmits to the failure state determination device 2001 data which includes the x coordinates of the pupil centers of the eyes and the amount of convergence calculated from the x coordinates of the eyes that are measured by the eye movement measurement unit 1004. The data includes five items of data which are an item 3701, an item 3702, an item 3703, an item 3704, and an item 3705. In FIG. 16, the item 3701 indicates an eyeglass ID whereby each eyeglass device 1001 is identified. An item 3702 indicates a sampling interval of the eye movement and indicates, in FIG. 16, that the eye movement is measured at 0.033 seconds intervals (sampling frequency of 30 Hz). The item 3703 and the item 3704 indicate the measurement results of the x coordinate of the pupil center of the right eye and the x coordinate of the pupil center of the left eye, respectively. The item 3705 indicates the amount of convergence calculated based on the measurement result of the eyes.

It should be noted that a plurality of pieces of the data as shown in FIG. 16 may collectively be transmitted to the failure state determination device 2001 or may each be transmitted at every measurement. Moreover, although not shown in FIG. 16, when collectively transmitting the plurality of pieces of data, the eye movement measurement interval, the number of pieces of data, the measurement time, or the like may be included in the data. Specifically, when collectively transmitting a result of one second of the measurement, the transmission data may have information added thereto such as 1 second as the measurement interval, 30 as the number of pieces of data, and, for example, 19:00:10:01-19:00:10:02 as the measurement time.

In step S403, the determination result reception unit 1007 receives from the failure state determination device 2001 the determination result as to whether the user is in the failure state.

In step S404, the eyeglass transmittance degree control unit 1003 determines whether the received result indicates that the user is in the failure state. If it is determined that the user is not in the failure state, the processing proceeds to step S405, and the eyeglass transmittance degree control unit 1003 presents the stereoscopic video to the user, without changing the method of controlling the liquid crystal shutters. On the other hand, if it is determined, in step S404, that the user is in the failure state, the processing proceeds to step S406, and, as with the above embodiment, the eyeglass transmittance degree control unit 1003 changes the method of controlling the liquid crystal shutters and presents the planar video to the user.

It should be noted that while, in the description of the processing of the eyeglass device 1001, the procedure is described in which the measurement process and transmission process of the eye movement of the user and the control process of the liquid crystal shutters which is performed based on the determination result are successively performed, the measurement process and transmission process of the eye movement of the user and the control process of the liquid crystal shutters which is performed based on the determination result may be performed asynchronously. For example, the measurement process and transmission process of the eye movement of the user may be performed at the measurement intervals in the eyeglass device 1001 while the determination result reception unit 1007 may wait for the determination result at intervals different from the measurement intervals. Alternatively, the determination result transmission unit 2007 may transmit a failure signal only when the user is in the failure state and the determination result reception unit 1007 may perform the processing of step S406 only upon reception of the failure signal.

It should be noted that if it is determined, in step S404, that the user is in the failure state, a message may be addressed to the user in step S406, instead of presenting the planar video to the user. Specifically, a message querying whether the user wishes to switch the stereoscopic video to the planar video is presented together with the description of the user state on the liquid crystal of the eyeglass device 1001 worn by a user determined to be in the failure state. If the user agrees to switch the stereoscopic video to the planar video, the user performs operation such as pressing a switch on the eyeglasses to switch the stereoscopic video to the planar video. Furthermore, the message may be displayed on the video display unit 102 instead of on the eyeglass device 1001 worn by the user determined to be in the failure state. This allows the other users viewing the same video to share the failure state of the user, and thus, for example, when a parent and a child are viewing the stereoscopic video, the parent is allowed to know when the child is determined to be in the failure state, and stop the child in the failure state from continuously viewing the stereoscopic video.

Figure 17:
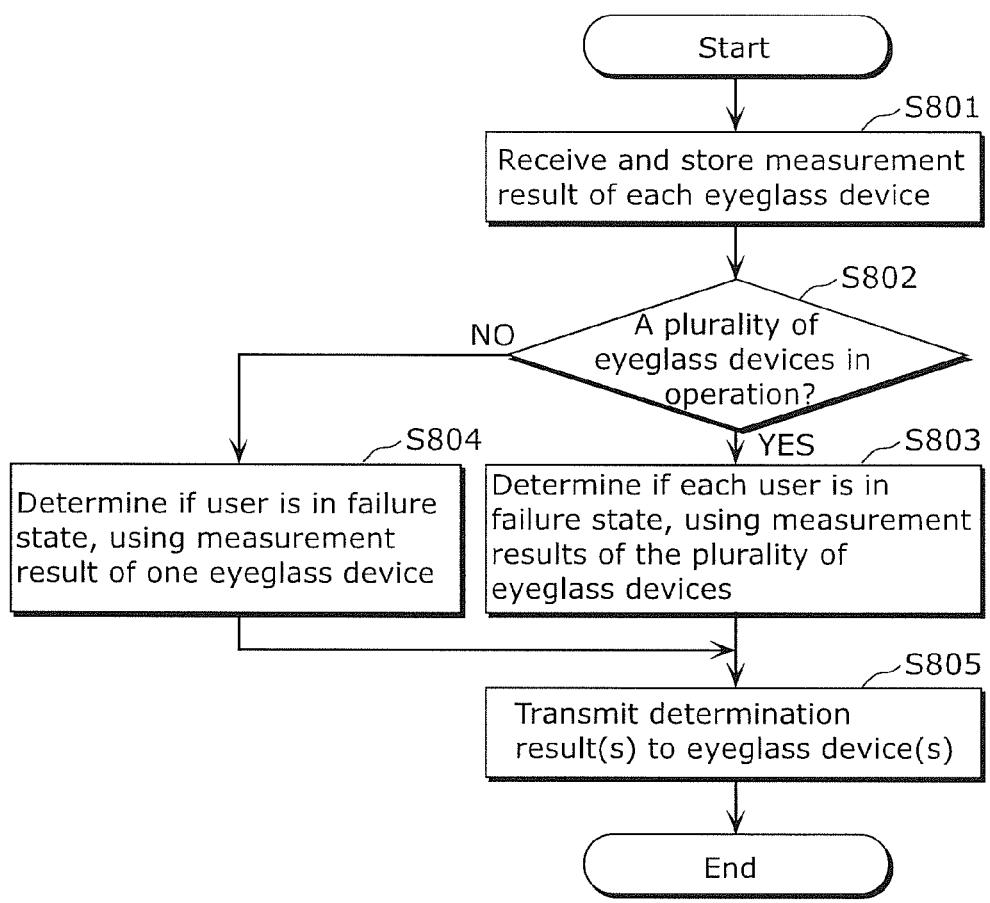
FIG. 17 is a flowchart illustrating basic processing of the failure state determination device according to the exemplary embodiment.

Next, processing of the failure state determination device 2001 will be described with reference to a flowchart illustrated in FIG. 17.

In step S801, the eye movement reception unit 2002 receives the measurement result of the eye movement transmitted from the eye movement transmission unit 1006 of each eyeglass device 1001, and stores the received result in the eyeglass-specific eye movement storage unit 2003. An example of the results which are each obtained by the measurement in each the eyeglass device 1001 and stored in the eyeglass-specific eye movement storage unit 2003 is shown in FIG. 18. The measurement result of the eye movement includes information indicated by an item 901, an item 902, and an item 1103. The item 901 indicates date and time of the measurement. The item 902 indicates IDs each corresponding to each eyeglass device 1001. The item 1103 indicates the measurement result in each eyeglass device 1001 described with reference to FIG. 10. In other words, the measurement result of the eye movement indicates the measurement result for each eyeglass device 1001.

In step S802, the user count determination unit 2004 determines the number of users currently viewing the stereoscopic video, from the measurement results of the user's eye movements stored in the eyeglass-specific eye movement storage unit 2003. For example, if there is a plurality of the measurement results which are obtained at the same time and a difference among the measurement results is within a predetermined value, it is determined that the number of users is plurality. If it is determined, in step S802, that the number of users currently viewing the stereoscopic video is plurality, the processing proceeds to step S803.

In step S803, the failure state determination unit 2005 determines if each of the users is in the failure state, based on a difference in result, stored in the eyeglass-specific eye movement storage unit 2003, of measuring the eye movements of the plurality of users viewing the same stereoscopic video, and transmits the determination result to the determination result transmission unit 2007. This identifies the user who is in the failure state.

Three specific examples of the method to determine the failure state of each user, using the measurement results of the eye movements of the plurality of users will be described below by type of the failure state of the user.

It should be noted that the following will describe mainly the convergence eye movement as the eye movement to be measured.

The first type is the case where it is determined that a state in which the user is unable to correctly perceive the stereoscopic view is the failure state of the user. In this type of the failure state, the user who is unable to perceive the stereoscopic view is determined to be in the failure state when there are a number of users who can/cannot perceive the stereoscopic view. More specifically, since the users are viewing the same stereoscopic video, it is determined whether the user showing the convergence eye movement and the user not showing the convergence eye movement are present together, based on the measurement results of the eye movements of the plurality of users in the same period. When it is determined that the user showing the convergence eye movement and the user not showing the convergence eye movement are present together, the user not showing the convergence eye movement is determined to be in the failure state.

Figure 19C:
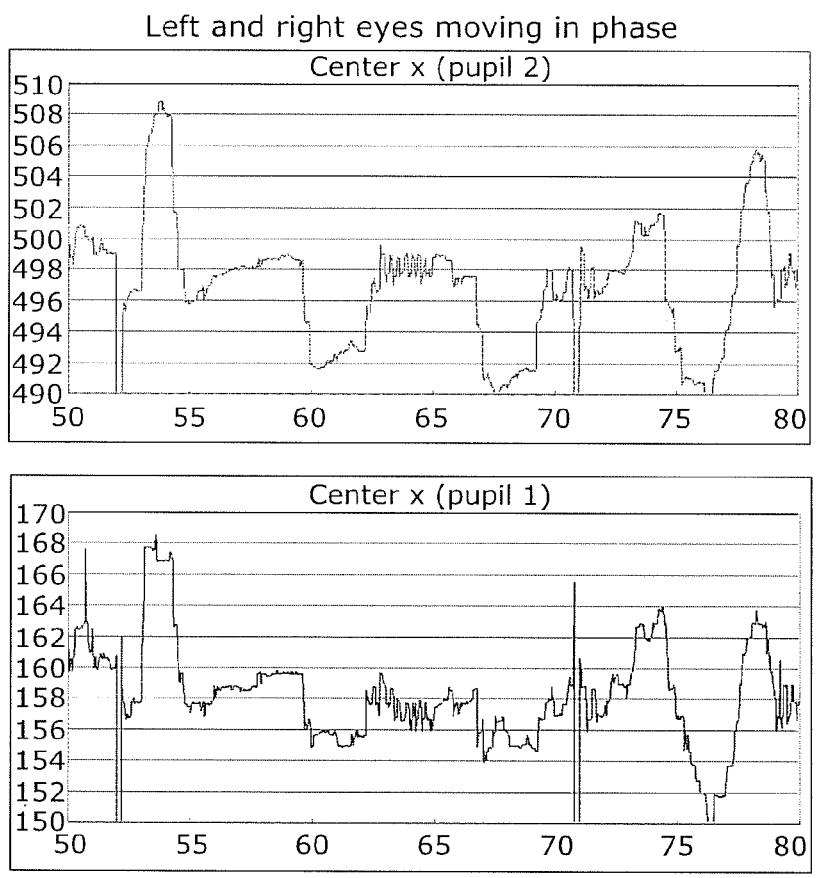
FIG. 19C is a diagram showing an example of a measurement result of the eye movement of a user who is unable at all to view the content in the stereoscopic manner.

FIG. 19A to FIG. 19C show examples of the measurement results of the eye movements of the users viewing the same content. FIG. 19A shows the measurement result of the user who can correctly perceive the content in the stereoscopic manner. FIG. 19B shows the measurement result of a user partially unable to perceive the stereoscopic view due to fatigue. FIG. 19C shows the measurement result of the user unable at all to perceive the stereoscopic view. In each figure, an upper graph indicates the measurement result of the left eye and a lower graph indicates the measurement result of the right eye. Users, like the user of FIG. 19C, who are unable to perceive the stereoscopic view is unable to perform the convergence eye movement. Thus, the amount of convergence is not detected. For example, when the amount of convergence is a value obtained by subtracting the reference amount of convergence from the measured amount of convergence, a user showing the amount of convergence smaller than or equal to a predetermined value in a timeslot in which the other users show the amount of convergence greater than or equal to the predetermined value in the measurement results, is determined to be in the failure state in which the user is unable to perceive the stereoscopic view.

When a user is unable to perceive the stereoscopic view while the other users are able to correctly perceive the stereoscopic view, the amount of convergence of the eye movement of the user is smaller than the amounts of convergence of the eye movements of the other users. Thus, such the determination allows the determination that the state in which a user is unable to correctly perceive the stereoscopic view as the failure state of the user.

Figure 20:
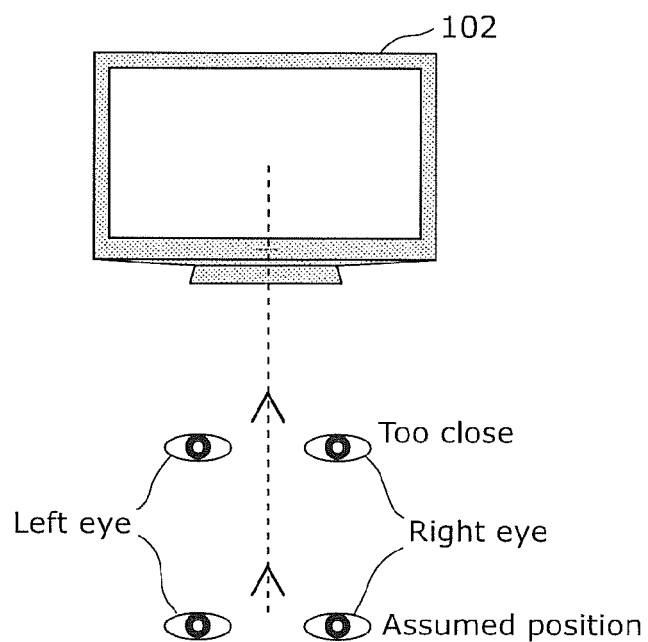
FIG. 20 is an explanatory diagram concerning user's viewing positions.
Figure 21:
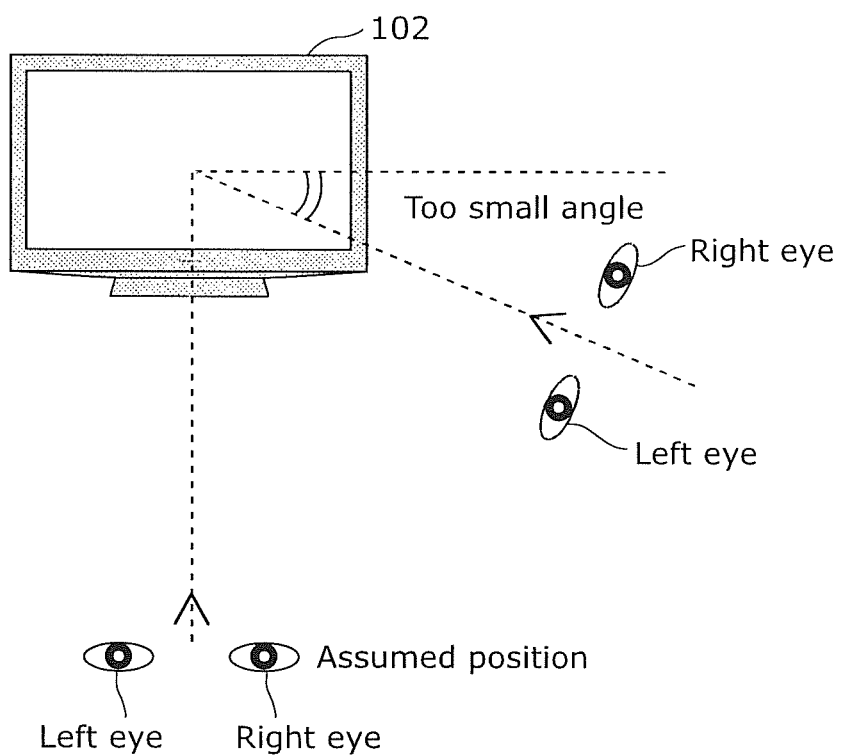
FIG. 21 is an explanatory diagram concerning user's viewing positions.

The second type is the case where it is determined that a state in which a user is viewing the stereoscopic video at an incorrect position is the failure state of the user. Here, the incorrect position indicates a position, as shown in FIG. 20, the distance therefrom to the video display unit 102 is too close, or a position, as shown in FIG. 21, at which an angle between the video display unit 102 and the user is too small. Typically, the stereoscopic video is created so that the stereoscopic view is correctly enabled in a predetermined range in front of the screen, and thus, at such the incorrect position, the user is unable to correctly perceive the stereoscopic view. Specifically, at the position the distance therefrom to the video display unit 102 is too close, the angle of convergence is greater than the angle of convergence assumed by the content creator. Thus, the amount of convergence to be measured and calculated by the eye movement measurement unit 1004 is large. In this case, the video is viewed such that the stereoscopic object appears as if projected from the screen to a greater extent than assumed, and thus the user when viewing the video at the incorrect position may be fatigued earlier as compared to the user when viewing the video at a correct position. Moreover, at the position at which the angle between the screen displaying the video and the user is too small, movements of the eyes at convergence are different. Thus, the user is unable to correctly perceive the stereoscopic view, such as a cube appears skewed.

Figure 22:
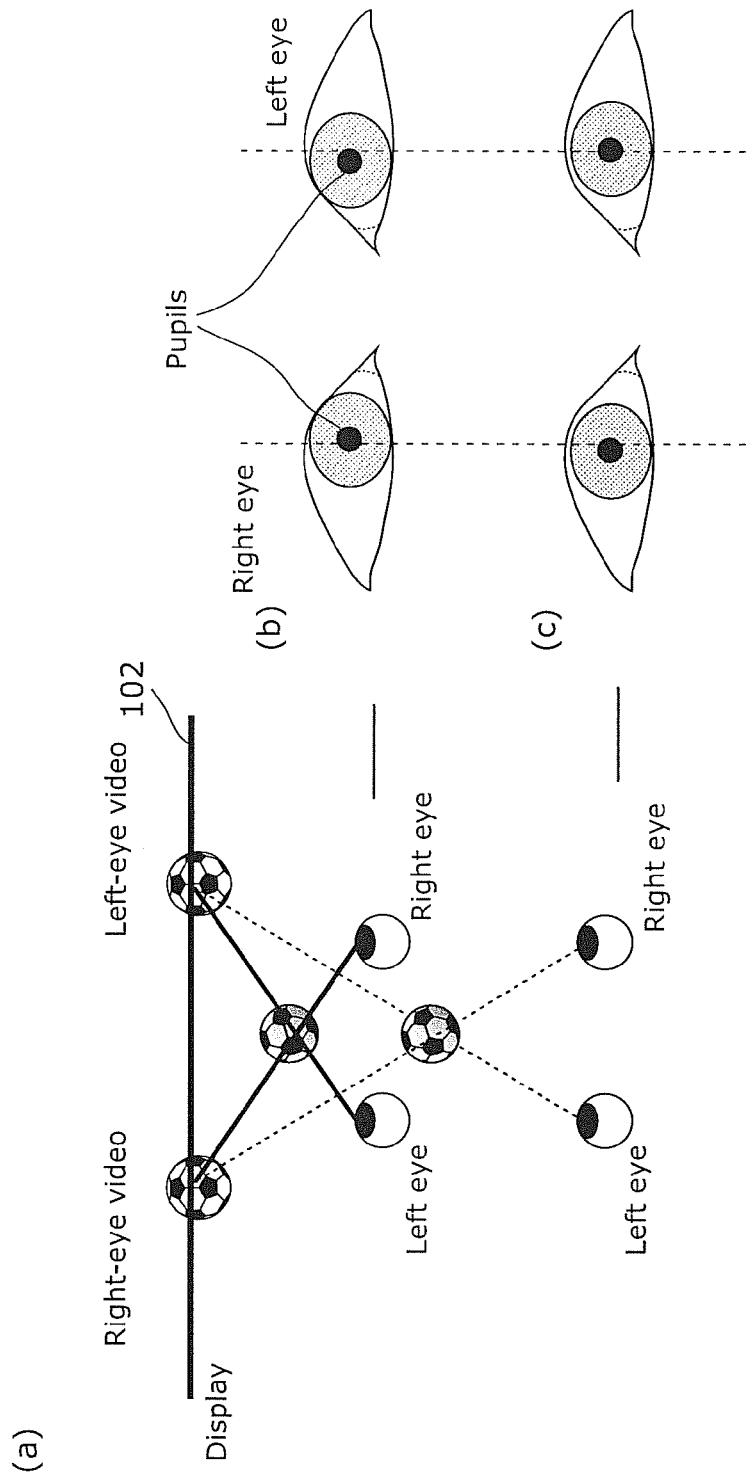
FIG. 22 is a diagram showing a difference in eye state due to a difference in distance between a video display unit and a user.

FIG. 22 is a diagram showing a difference in eye state due to a difference in distance between the video display unit 102 and a user. Part (a) of FIG. 22 is a diagram showing viewing directions of a user close to the screen (the video display unit 102) and a user far from the screen. Even in the same stereoscopic video (image), (b) of FIG. 22 is a diagram showing the pupil positions of the user close to the screen, and (c) of FIG. 22 is a diagram showing the pupil positions of the user far from the screen. As shown in (b) and (c) of FIG. 22, the closer the user is to the screen, the larger amount of convergence is and the closer the stereoscopic object appears to the user.

Figure 23:
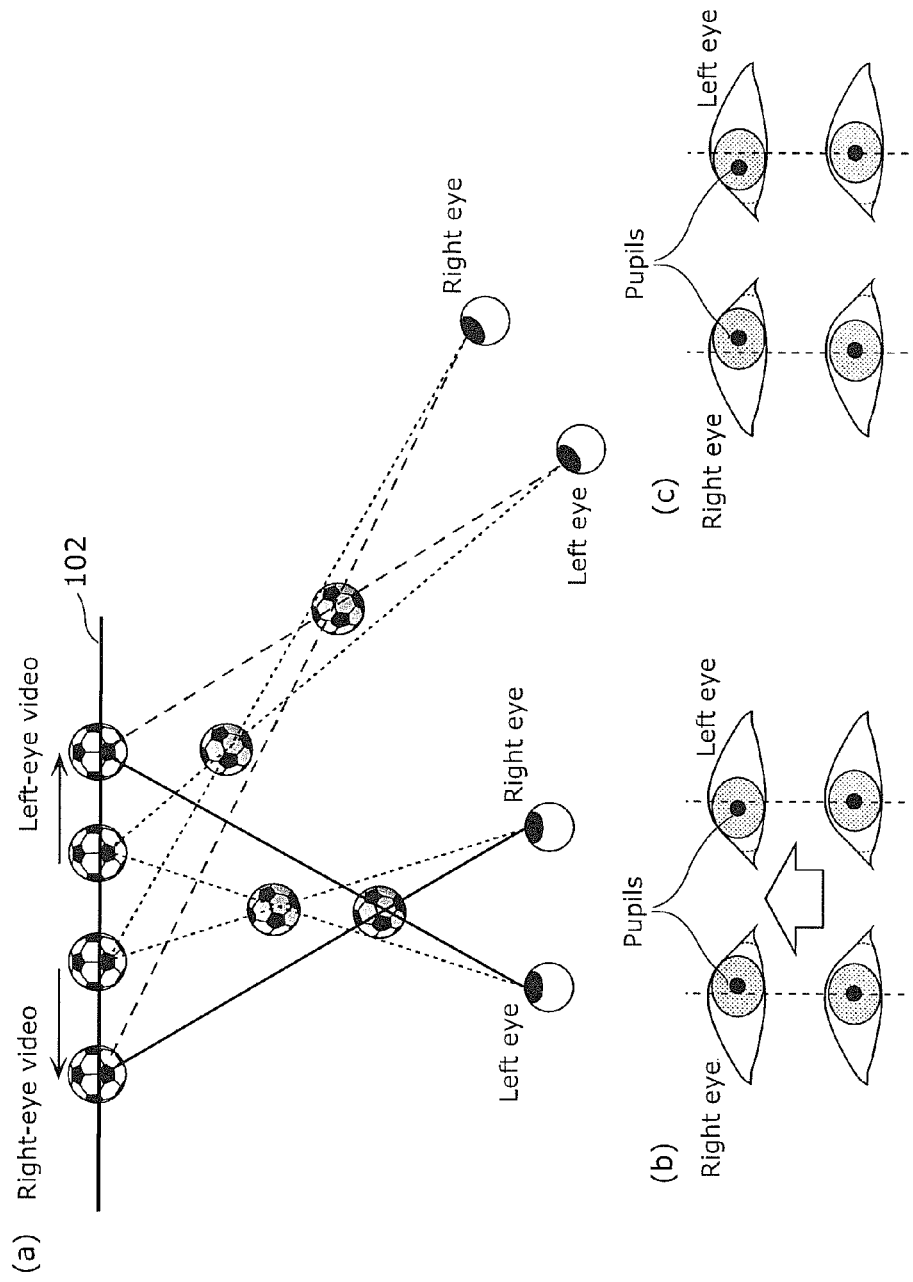
FIG. 23 is a diagram showing a difference in eye state due to a difference in angle of a user relative to the video display unit.

FIG. 23 is a diagram showing a difference in eye state due to a difference in angle of a user relative to the video display unit 102. Part (a) of FIG. 23 is a diagram showing the movement of the viewing direction of the user when viewing the screen from the front and the movement of the viewing direction of the user when viewing the screen at an oblique angle when the stereoscopic video in which an object appears as if approaching the user is displayed on the video display unit 102 (screen). Part (b) of FIG. 23 is a diagram showing the change in pupil positions of the user when viewing the screen from the front, and the positions of the pupils change from as shown in a lower figure to as shown in an upper figure of (b) of FIG. 23. Part (c) of FIG. 23 is a diagram showing the change in pupil positions of the user when viewing the screen from the oblique direction, and the positions of the pupils changes from as shown in a lower figure to as shown in an upper figure shown in (c) of FIG. 23. As shown in (b) and (c) of FIG. 23, even when the users are viewing the same stereoscopic video, the user when viewing from a position at which an angle between the screen and the user is small (the user when viewing from the oblique direction) has different variations in amount of convergence between the right eye and the left eye. More specifically, upon occurrence of the convergence eye movement, the amounts of convergence of one of the left eye and the right eye that is closer to the screen (the eye that forms a smaller angle with the screen), has a smaller variation in amount of convergence, as compared to the other eye. In the examples shown in (a) and (c) of FIG. 23, the right eye has a smaller variation in amount of convergence as compared to the left eye.

Thus, the failure state determination unit 2005 compares the amounts of convergence of the plurality of users at the same time and determines that a user having the amount of convergence greater than any other users by the predetermined value or greater is in the failure state in which the user is too close to the screen. Moreover, when determined that the change in amounts of convergence of the user is larger than the change in amount of convergence of the eye movements of other users by the predetermined value or greater, the failure state determination unit 2005 calculates a difference in amount of convergence between the right eye and the left eye or a ratio of the amount of convergence between the right eye and the left eye, and determines that a user having the obtained value greater than or equal to the predetermined value as compared to the other users is in the failure state in which the angle between the user and the screen is too small.

The amount of convergence is large when the viewing position is too close to the display screen as compared to the original viewing position is. Thus, such the determination allows the determination that the state in which the user is too close to the display screen as the failure state of the user.

Figure 24:
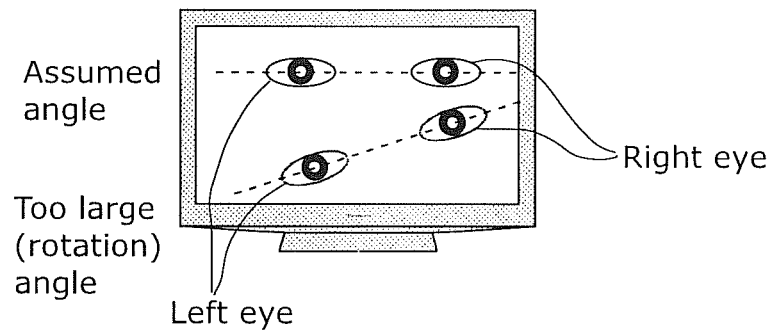
FIG. 24 is an explanatory diagram concerning user's viewing positions.

Furthermore, as shown in FIG. 24, a user who has a degree of rotation about the screen may be detected. For example, viewing the stereoscopic video in a lying position is likely to cause video-induced motion sickness in the user. When the user views the video while having such the angle of rotation, the angle of convergence is small as compared to the case where the user views the video at a correct angle, the eye movements in the vertical axis direction (the vertical direction) are also observed Determination that a user is viewing the screen while having the angle of rotation about the screen is made when the following conditions are satisfied: the convergence eye movement occurs in the measurement result of the eye movements among the plurality of users at the same time; there is a user whose amount of convergence is smaller than the amounts of convergence of the eye movements of the other users by the predetermined value or greater; and the user further shows a different eye movement in the vertical axis direction as compared to the other users. Such a user is determined to be in the failure state in which the angle of rotation about the screen is too large.

The third type is the case where it is determined that a state in which a user is fatigued as compared to the other users is the failure state of the user. Whether the user is fatigued is determined, for example, using a difference in eye movement performance between the user and the other users. As shown in FIG. 19B, when the user is unable to correctly perceive the stereoscopic view due to fatigue, the user performs an eye movement different from the eye movement performed by the other users who can correctly perceive the stereoscopic view. When the user is unable to correctly perceive the stereoscopic view due to fatigue as described above, the user ends up having partially small amounts of convergence as compared to the amounts of convergence of the eye movement performed by the other users who can correctly perceive the stereoscopic view. Thus, an integrated value of the amounts of convergence of a user during the same predetermined period is calculated and compared with those of the other users, and if a user has an integrated value smaller than the integrated values of any other users by a predetermined value or greater, the user is determined to be in the failure state.

When the user is unable to correctly perceive the stereoscopic view due to fatigue, typically, the user ends up having partially small amounts of convergence as compared to the amounts of convergence of the eye movement performed by the other users who can correctly perceive the stereoscopic view. Thus, such a determination allows the determination that the state in which the user is fatigued as the failure state of the user.

Moreover, as other determination method, for example, a reaction rate of the eye movement may be used. Specifically, in a scene due to which the change in amount of convergence greater than or equal to the predetermined amount is measured during a predetermined time, the reaction rate of convergence eye movement, i.e. the reaction rate of the eye movement in the depth direction is calculated based on the variation in amount of convergence and time required for the change in amount of the convergence. If a user has a slower reaction rate as compared to the other users, the user is determined to be in the failure state in which the user is fatigued.

When the user is unable to correctly perceive the stereoscopic view due to fatigue, typically, the user ends up having a slower reaction rate than the reaction rate of the eye movement performed by the other users who can correctly perceive the stereoscopic view. Such the determination allows the state in which the user is fatigued to be determined as the failure state of the user.

It should be noted that when the determination is made by comparison between a user and the other users, the determination as to whether the user is in the failure state may be made based on whether the user has a smaller integrated value than, for example, a user having the largest integrated value of the amounts of convergence by the predetermined value or greater. Moreover, whether the user is in the failure state may be determined by separately calculating the integrated values of the amounts of convergence of the eyes of the users to calculate the largest integrated value of each of the left eye and the right eye, and comparing the sum of the largest integrated values of the left and right eyes with the sum of the integrated values of the amounts of convergence of the left and right eyes of the user. Moreover, a variance value of the amount of convergence of the eye movement of each user may be calculated and a user having a predetermined value or greater of the variance value of the amount of convergence may be determined to be in the failure state. Alternatively, the same method may be used for the determination using the reaction rate of the eye movement.

Meanwhile, in step S802, when the user count determination unit 2004 determines that the number of users who are currently viewing the stereoscopic video is 1, based on the measurement result of the eye movement of the user stored in the eyeglass-specific eye movement storage unit 2003, the processing proceeds to step S804.

In step S804, the failure state determination unit 2005 determines whether the user is in the failure state, based on the measurement result, stored in the eyeglass-specific eye movement storage unit 2003, of the eye movement of the one user when viewing the stereoscopic video, and transmits the determination result to the determination result transmission unit 2007.

The type of failure state of the user that is determined by the failure state determination unit 2005 is the same as the type determined in step S803, and the failure state determination unit 2005 determines the failure state of each type by the same method as that in step S803, provided that the eye movement is compared with an assumed amount of convergence or an assumed angle of convergence which is previously stored in association with the playback time of the content in the failure state conditions storage unit 2006, instead of with the measurement result of the eye movement of the user.

In step S805, the determination result transmission unit 2007 transmits the determination result received from the failure state determination unit 2005 to each eyeglass device 1001.

Figure 25A:
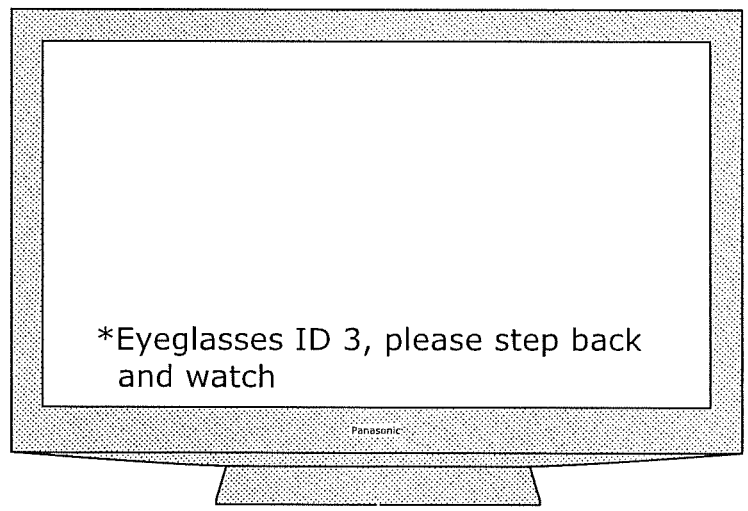
FIG. 25A is a diagram showing an example of a message displayed on the video display unit when the failure state of a user is detected.
Figure 25B:
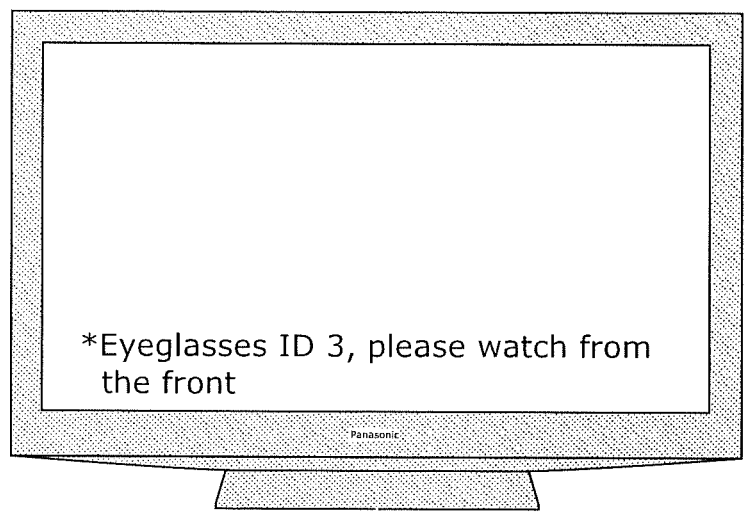
FIG. 25B is a diagram showing an example of a message displayed on the video display unit when the failure state of a user is detected.

It should be noted that, the determination result transmission unit 2007 may transmit the determination result to the video display unit 102 and display a message on the video display unit 102, in accordance with the type of failure state. For example, when the failure state of the user when viewing the video at the incorrect position is detected, a message is displayed on the video display unit 102 instead of controlling the eyeglass device 1001. When it is determined that the user is too close to the screen, a massage as shown in FIG. 25A may be displayed. When it is determined that an angle between the user and the screen is too small, a message as shown in FIG. 25B may be displayed.

It should be noted that when it is determined, in step S802, that the number of users currently viewing the stereoscopic video is 1 and it is determined, in step S804, that the user is in the failure state, the video display device 101 may present the planar video unlike the case where the number of users is plurality and the eyeglasses are controlled to present the planar video to the user. In other words, the video display device 101 may display only the left-eye video or the right-eye video. For example, when it is determined that the user is in the failure state, the left shutter/right shutter switch control of the eyeglasses is terminated after displaying on the liquid crystal (the liquid crystal shutters) of the eyeglasses or on the video display unit 102 a message indicating that it is determined that the user is in the failure state and thus the video displayed on the video display unit 102 is to be switched from the stereoscopic video to the planar video.

It should be noted that, in the embodiment, the failure state determination device 2001 is configured separately from the eyeglass device 1001 the description is given as such. The failure state determination device, however, may be implemented on the video display device 101 like a TV or on the eyeglass device 1001.

Data exchange between the eyeglass device 1001 and the video display device 101 in each case will be described.

In the case where the failure state determination device 2001 is implemented on the video display device 101 like a TV, as shown in FIG. 26, the measurement result of the eye movement is transmitted from the eyeglass device 1001, and the failure state determination device 2001 implemented on the video display device 101 having received the measurement result determines the failure state, and transmits to the eyeglass device 1001 the result or an instruction for controlling the eyeglasses based on the result.

Figure 27:
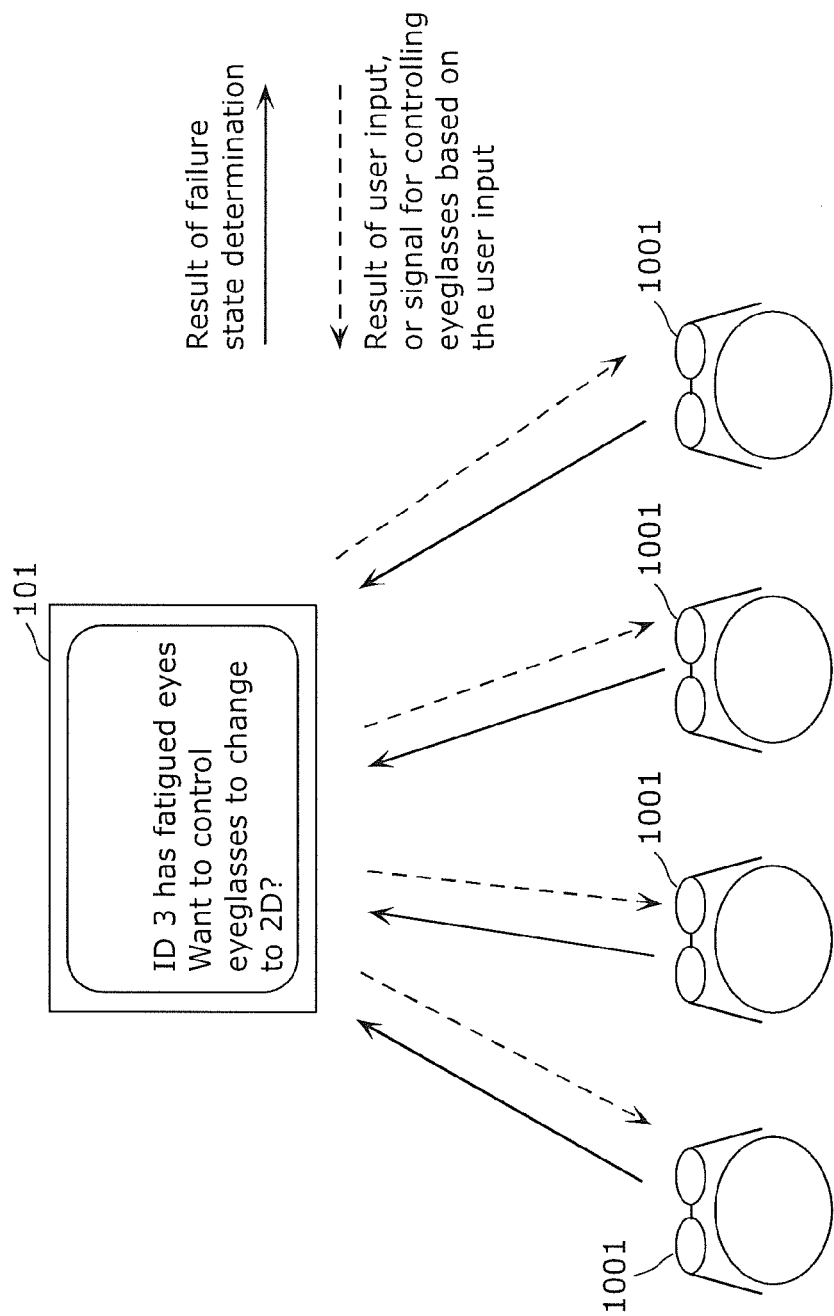
FIG. 27 is a diagram showing signal flows when the failure state determination device is implemented on the eyeglass device.

On the other hand, in the case where the failure state determination device 2001 is implemented on the eyeglass device 1001, the failure state determination device 2001 controls the eyeglass device 1001, and is not particularly required to exchange data with the video display device 101 when the stereoscopic view is to be switched to the planar view. When a message is displayed on the video display unit 102, however, the failure state determination device 2001 of the eyeglass device 1001 transmits the failure state determination result to the video display device 101. Moreover, there is a case, as shown in FIG. 27, where a confirmation message for controlling the eyeglass device 1001 is displayed on the video display device 101, and the eyeglass device 1001 is controlled based on a result of user input. In this case, the failure state determination device 2001 of the eyeglass device 1001 transmits the failure state determination result to the video display device 101. As shown in FIG. 27, based on the received failure state determination result, the video display device 101 displays a confirmation message whether the eyeglass device 1001 is to be controlled. The user replies to the confirmation message by input using a remote or the like. If the reply is for switching the stereoscopic view to the planar view, the video display device 101 transmits to the eyeglass device 1001 a signal for switching the eyeglasses control to the planar view.

As described above, the configuration and the processing of the present embodiment allow the determination of the failure state of each user by comparing the measurement results of the eye movements of the plurality of users. Thus, only for a user whose eye movement is in the failure state, among the plurality of users viewing the same stereoscopic video, delivery of a message or switching a video being viewed by the user from a stereoscopic video to a planar video is possible.

For example, by controlling the liquid crystal shutters of the eyeglasses worn by the user, the stereoscopic video is switched to the planar video. Thus, the video being viewed by the user in the failure state can be switched from the stereoscopic video to the planar video while keeping the video being viewed by the user who is not in the failure state as the stereoscopic video.

It should be noted that, in the present embodiment, the example is described in which the failure state of one of the plurality of users is detected. For example, when two users are viewing the stereoscopic video and if one of the users is determined to be fatigued in viewing the stereoscopic video, the eyeglasses worn by the fatigued use is controlled so that the stereoscopic video is switched to the planar video. Here, one user is viewing the stereoscopic video and the other user is viewing the planar video. Then, if the user when viewing the stereoscopic video is determined to be fatigued in viewing the stereoscopic video, both the two users ends up viewing the planar video. Here, since both the two users do not need to wear the eyeglasses for stereoscopic viewing, the screen should render the planar video. Thus, when the failure is detected in all users whose eye movements are under measurement, the users may be allowed to stop wearing the eyeglasses and the video may be switched so that the planar video is displayed on the screen.

(Modification)

In the above-described embodiment, the video being viewed by the user is switched from the stereoscopic video to the planar video by the eyeglass transmittance degree control unit 1003 controlling the transmittance degrees of the left shutter and the right shutter of the eyeglasses at timing when the eyeglass device 1001 has received the determination, from the failure state determination device 2001, that the user is in the failure state. In the present modification, the transmittance degrees of eyeglasses are controlled at a timing different from the timing when the user is determined to be in the failure state.

Figure 28:
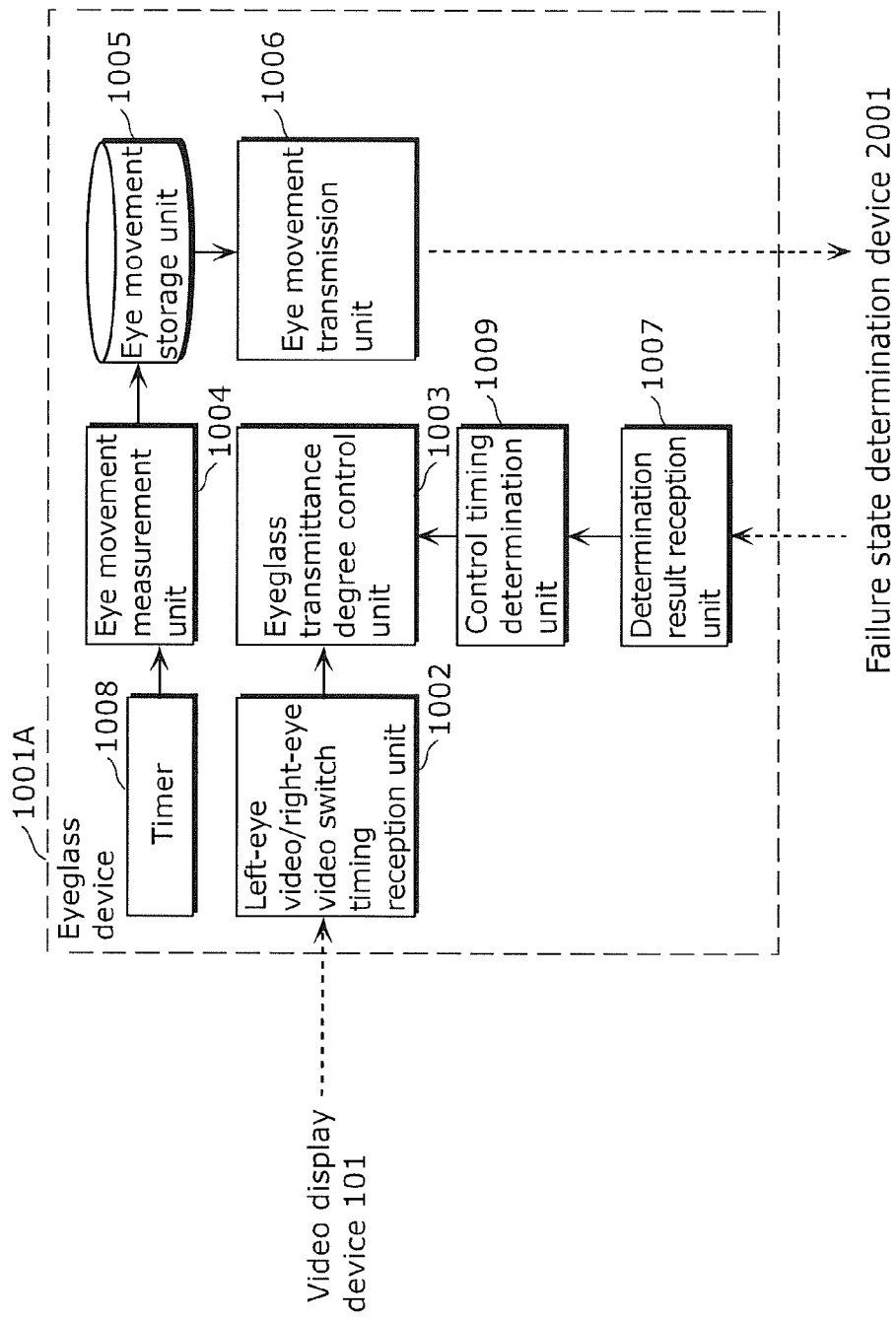
FIG. 28 is a block diagram showing a functional configuration of an eyeglass device according to a modification of the exemplary embodiment.

FIG. 28 is a block diagram showing a functional configuration of an eyeglass device according to the present modification. The modification is different from the above embodiment in that the modification includes, in an eyeglass device 1001A, a control timing determination unit 1009 which determines the timing to control the transmittance degrees of the eyeglasses, based on a determination result by the failure state determination device 2001.

Figure 29:
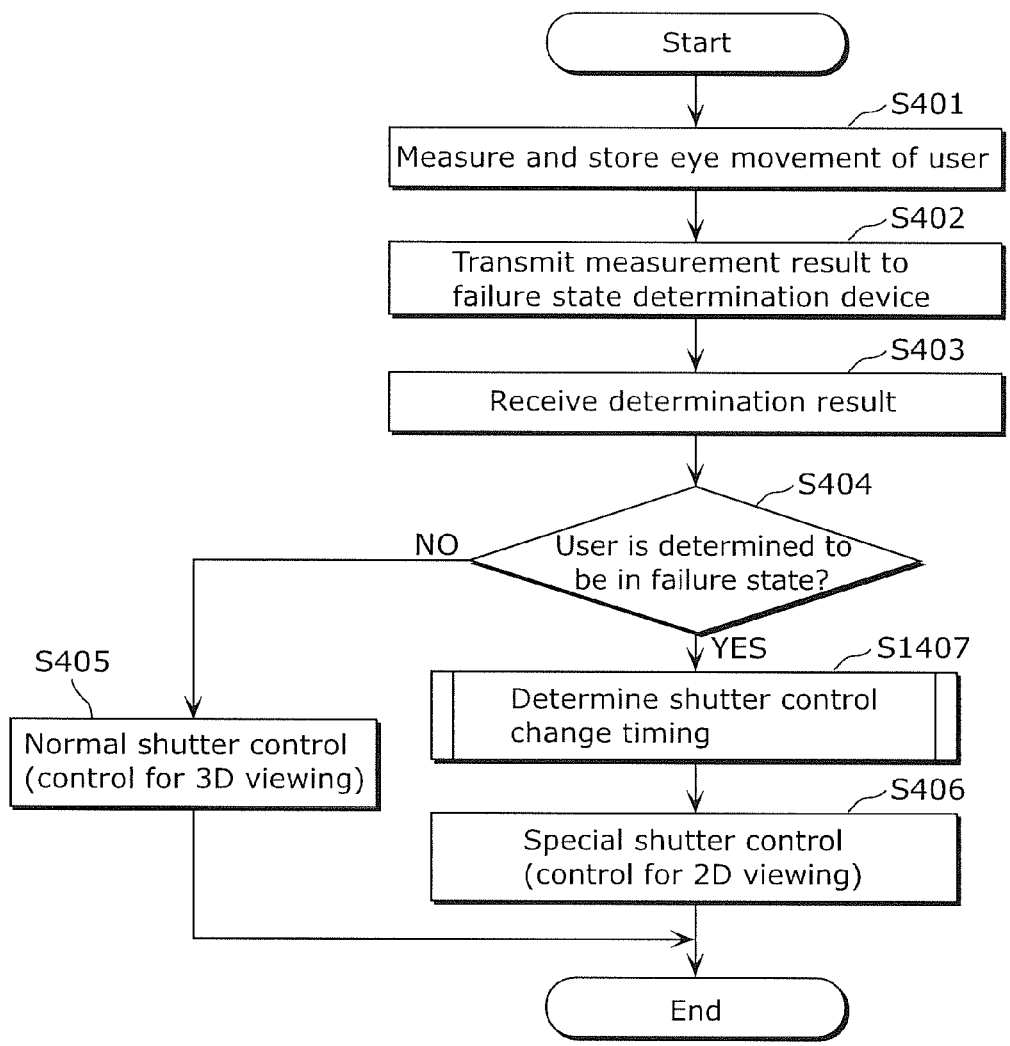
FIG. 29 is a flowchart illustrating basic processing of the eyeglass device according to the modification of the exemplary embodiment.
Figure 30:
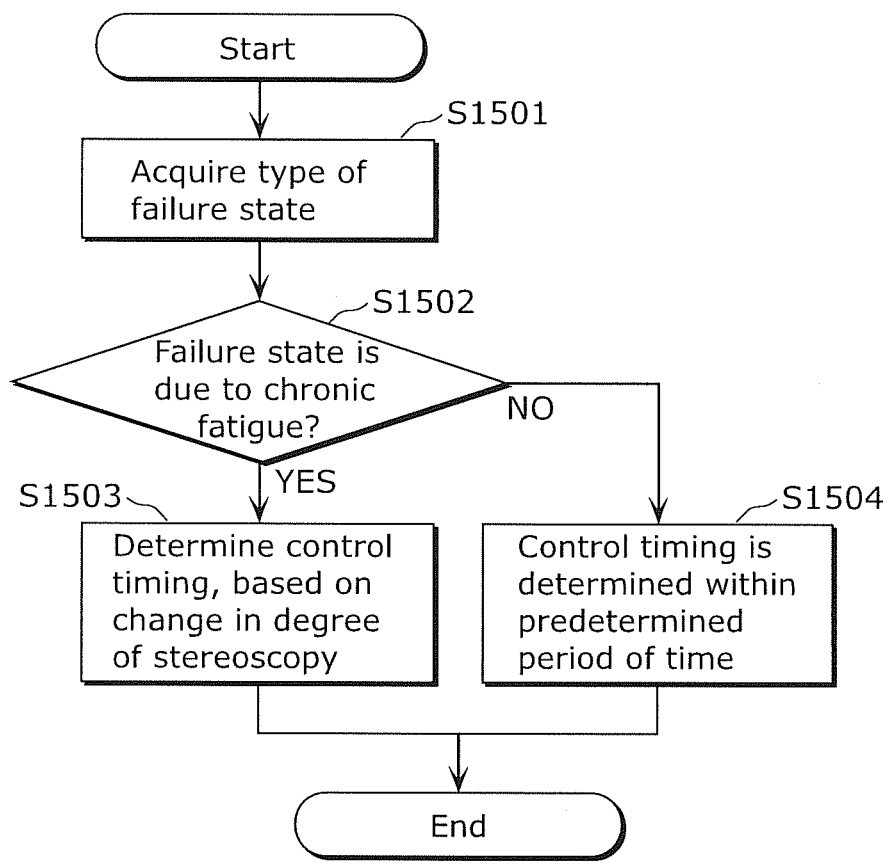
FIG. 30 is a flowchart illustrating basic processing of a control timing determination unit according to the modification of the exemplary embodiment.

Processing of the eyeglass device 1001A in the present modification is shown in a flowchart illustrated in FIG. 29. The flowchart includes step S1407, i.e., a shutter control change timing determination process, which is the only difference from the flowchart illustrated in FIG. 7 showing the processing of the eyeglass device 1001 in the embodiment. Thus, the processing performed in step S1407 will be described with reference to the flowchart illustrated in FIG. 30.

In step S1501, the determination result reception unit 1007 acquires a determination result as to whether the user is in the failure state from the failure state determination device 2001, and, if the user is in the failure state, also acquires the type of the failure state. The control timing determination unit 1009 acquires the determination result and the type of failure state from the determination result reception unit 1007.

In step S1502, if the acquired determination indicates that the user is in the failure state, the control timing determination unit 1009 determines whether the failure state is due to chronic fatigue. Specifically, the chronic fatigue is a failure state based on fatigue indicated as the third type of the failure state in the embodiment. In other words, the chronic fatigue is the failure state in which the failure state determined based on the integrated value of the amounts of convergence or the reaction rate of the eye movement persists over a period of time greater than or equal to a predetermined period of time. Meanwhile, examples of the failure state that is not the chronic fatigue include the states described in the embodiment as the first and second types of failure states in which the user is unable to correctly perceive the stereoscopic view and in which the position of the user is inappropriate to the display screen. Even when the user is in the failure state described in the embodiment as the third type of failure state that is based on fatigue, there is a case where the integrated value of the angles of convergence or the reaction rate of the eye movement decreases during a period of time less than the predetermined period of time. When the user is in the failure state due to the chronic fatigue, the user is able to perceive the stereoscopic view, and thus the video being viewed by the user is not necessarily instantly switched to the 2D video. However, when the user is in the failure state that is not due to the chronic fatigue, the user is originally unable to perceive the stereoscopic view, and thus the video being viewed by the user needs to instantly be switched to the 2D video in order to prevent the user from continuously viewing the 3D video while being put stress in viewing the 3D video.

Figure 31:
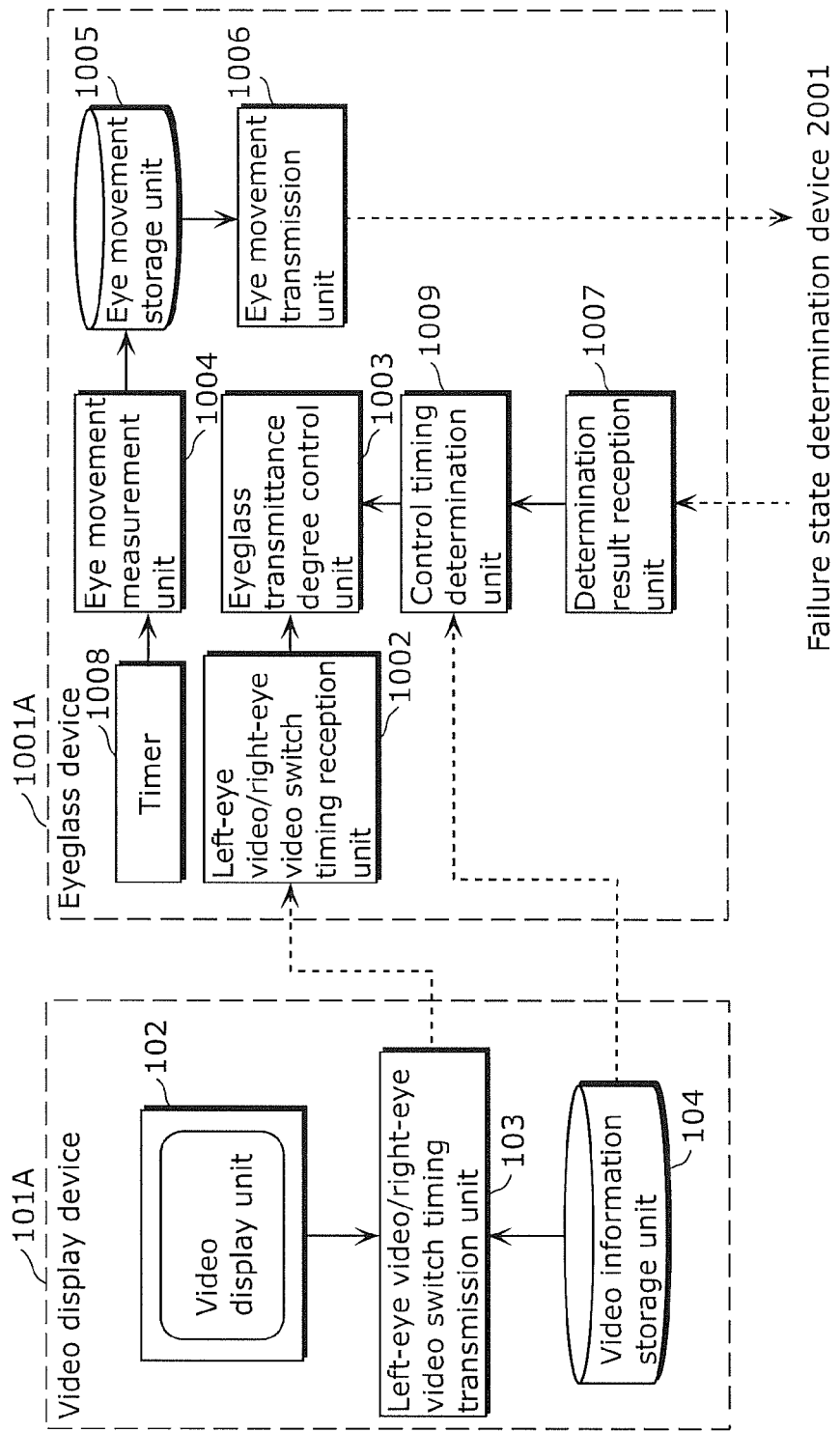
FIG. 31 is a block diagram showing functional configurations of a video display device and the eyeglass device which are included in a stereoscopic video presenting apparatus according to the modification of the exemplary embodiment.

Here, when it is determined that the user is in the failure state due to the chronic fatigue, the processing proceeds to step S1503, and the control timing determination unit 1009 determines the control timing, based on the degree of stereoscopy of the video. Specifically, the control timing is determined so that the stereoscopic video is changed to the planar video at a timing at which the change in degree of stereoscopy is small or a timing at which the degree of stereoscopy itself is small. This is based on assumption that the failure state based on the chronic fatigue is likely due to accumulative fatigue, and thus there is no need to respond to such the failure state. In other words, this is based on an idea that the present disclosure switches the stereoscopic video to the planar video without making a user feel a sense of discomfort, by changing the stereoscopic video at a timing at which the change in video caused by changing the method of controlling the liquid crystal shutters is as small as possible. Specific method to determine the control timing is to determine, based on the measurement result of the eye movement of the user, that the timing at which no convergence occurs (timing at which the amount of convergence of the eye movement of the user is less than a predetermined threshold amount of convergence) as the timing at which the user is viewing the planar video, and use the timing as the control timing to switch the stereoscopic video to the planar video. It should be noted that a video display device 101A that includes a video information storage unit 104 as shown in FIG. 31 may be used instead of the video display device 101. The video information storage unit 104 stores therein information on the change in degree of stereoscopy of the video over time. The control timing determination unit 1009 may use the information stored in the video information storage unit 104 to determine the control timing in step S1503. In other words, after the failure state is detected by a long-term measurement, the control timing determination unit 1009 acquires, from the video information storage unit 104, information on the change in degree of stereoscopy over time in the future, and acquires a time at which the degree of stereoscopy is small. The control timing determination unit 1009 changes, at the acquired time, the method of controlling the liquid crystal shutters.

On the other hand, when it is determined, in step S1502, that the user is not in the failure state based on the chronic fatigue, the processing proceeds to step S1504, and the control timing is determined so that the method of controlling the liquid crystal shutters is changed within a predetermined period of time. Here, it is assumed that the predetermined period of time is as early as possible, and it is essentially determined that the method is instantly switched. For example, when a failure state due to the user when viewing the stereoscopic video while sitting is about to lie down to view the stereoscopic video while lying is detected, the present disclosure instantly switches from presenting the stereoscopic video to presenting the planar video.

As described above, the configuration and the processing of the present modification allow the stereoscopic video to be changed to the planar video, based on the type of failure state, causing a reduced sense of discomfort.

In other words, in the case of the failure state due to fatigue, the video being viewed by the user in the failure state can be changed from the stereoscopic video to the planar video at the timing at which the amount of convergence of the eye movement is less than the predetermined threshold amount of convergence. This allows the stereoscopic video to be changed to the planar video without making the user feel a sense of discomfort.

As described above, while the stereoscopic video presenting apparatus according to the exemplary embodiment is described, the present disclosure is not limited to the exemplary embodiment.

Figure 32:
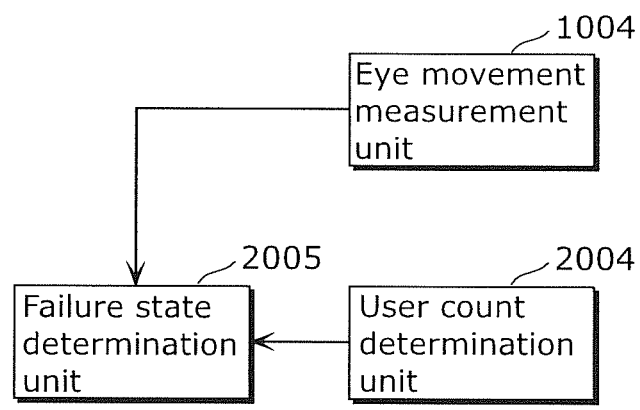
FIG. 32 is a block diagram showing a functional configuration of a stereoscopic video presenting apparatus which includes essential components of the present disclosure.

Essential components of the present disclosure, among the components of the stereoscopic video presenting apparatus shown in FIG. 6, is the eye movement measurement unit 1004, the user count determination unit 2004, and the failure state determination unit 2005. It is desirable but may not be necessary that the stereoscopic video presenting apparatus also includes the other components. FIG. 32 is a block diagram showing a functional configuration of the stereoscopic video presenting apparatus which includes the essential components of the present disclosure. The stereoscopic video presenting apparatus is a stereoscopic video presenting apparatus for presenting to a user the stereoscopic video by controlling opening and closing of the left-eye shutter and the right-eye shutter which are included in the eyeglasses for stereoscopic viewing worn by the user, in synchronization with the timing of displaying the left-eye video and the right-eye video, and the stereoscopic video presenting apparatus includes: the eye movement measurement unit 1004 for measuring the eye movement of each of users viewing the stereoscopic video; the user count determination unit 2004 for determining the number of users viewing the same stereoscopic video; and the failure state determination unit 2005 for determining the user whose eye movement is in the failure state, among a plurality of users, by comparing the eye movements of the plurality of users when the user count determination unit 2004 determines that the number of users viewing the same stereoscopic video is plurality.

It should be noted that each device described above may be configured as a computer system which includes, specifically, a microprocessor, a ROM, a RAM, a hard disk drive, a display unit, a keyboard, a mouse, and the like. A computer program is stored in the RAM or the hard disk drive. The function of each device is performed by the microprocessor operating in accordance with the computer program. Here, the computer program includes a combination of a plurality of instruction codes for giving instructions to the computer to perform predetermined functions.

In other words, the program causes the computer to execute processes included in a stereoscopic video presenting method. The stereoscopic video presenting method is a stereoscopic video presenting method for presenting a stereoscopic video to a user by controlling opening and closing of a left-eye shutter and a right-eye shutter which are included in eyeglasses for stereoscopic viewing worn by the user, in synchronization with a timing to display a left-eye video and a right-eye video, the stereoscopic video presenting method including: measuring an eye movement of each of users viewing the stereoscopic video; determining the number of users viewing a same stereoscopic video; and comparing, when it is determined in the determination that the number of users viewing the same stereoscopic video is plurality, eye movements of a plurality of users to determine a user whose eye movement is in a failure state among the plurality of users.

Furthermore, part or the whole of the components included in each of the devices described above may be configured with one system LSI (Large Scale Integration). The system LSI is a super multi-function LSI manufactured by integrating a plurality of components on one chip, and is, specifically, a computer system which includes a microprocessor, a ROM, a RAM, or the like. The computer program is stored in the RAM. The system LSI performs its functionality by the microprocessor operating in accordance with the computer program.

Furthermore, part or the whole of the components included in each of the devices described above may be configured with an IC card or a single module detachable to each device. The IC card or the module is a computer system which includes a microprocessor, a ROM, a RAM, or the like. The IC card or the module may include the super multi-function LSI described above. The IC card or the module performs its functionality by the microprocessor operating in accordance with the computer program. The IC card or the module may be of tamper-resistant.

Moreover, the present disclosure may be implemented as the methods described above. Moreover, the present disclosure may be achieved as a computer program implementing such methods via a computer, or may be implemented as digital signals including the computer program.

Furthermore, the present disclosure may be achieved as a non-transitory computer-readable recording medium having recorded therein the computer program or the digital signals, such as a flexible disk, a hard disk, CD-ROM, MO, DVD, DVD-ROM, DVD-RAM, BD (Blu-ray Disc (registered trademark)), and a semiconductor memory. Moreover, the present disclosure may be implemented as the digital signals recorded in such the non-transitory recording medium.

Moreover, the present disclosure may be achieved as transmitting the computer program or the digital signals via an electric communication line, a wireless or wired communication line, a network represented by the Internet, data broadcast, or the like.

Moreover, the present disclosure may be achieved as a computer system which includes a microprocessor and a memory, the memory may store therein the computer program, and the microprocessor operates in accordance with the computer program.

Moreover, by transferring the program or the digital signals recorded in the non-transitory recording medium, or transferring the program or the digital signals via the network or the like, the program or the digital signals may be executed in other independent computer system.

While only one or more exemplary embodiments of the present disclosure have been described based on the exemplary embodiment, the present disclosure is not limited to the exemplary embodiment. Various modifications to the present embodiments that may be conceived by those skilled in the art and combinations of components of different embodiments are intended to be included within the scope of the one or more exemplary embodiments, without departing from the spirit of the one or more exemplary embodiments.

The herein disclosed subject matter is to be considered descriptive and illustrative only, and the appended Claims are of a scope intended to cover and encompass not only the particular embodiment(s) disclosed, but also equivalent structures, methods, and/or uses.

INDUSTRIAL APPLICABILITY

A stereoscopic video presenting apparatus according to one or more exemplary embodiments disclosed herein enables to present a video to a user when viewing a stereoscopic video, without making the user feel a sense of discomfort. One or more exemplary embodiments disclosed herein correspond to the frame sequential method which is widely used at movie theaters and consumer televisions. Thus, one or more exemplary embodiments disclosed herein have high industrial applicability.

The invention claimed is:

1. A stereoscopic video presenting apparatus for presenting a stereoscopic video to a user by controlling opening and closing of a left-eye shutter and a right-eye shutter which are included in eyeglasses for stereoscopic viewing worn by the user, in synchronization with a timing to display a left-eye video and a right-eye video, the stereoscopic video presenting apparatus comprising:

an eye movement measurement unit configured to measure an eye movement of each of users viewing the stereoscopic video;
a user count determination unit configured to determine the number of users viewing a same stereoscopic video; and
a failure state determination unit configured to compare, when the user count determination unit determines that the number of users viewing the same stereoscopic video is plurality, eye movements of a plurality of users to determine a user whose eye movement is in a failure state among the plurality of users.

2. The stereoscopic video presenting apparatus according to claim 1, further comprising
a control change unit configured to present, to the user determined to be in the failure state by the failure state determination unit, only one of the right-eye video and the left-eye video by changing a control method for opening and closing of the left-eye shutter and the right-eye shutter of the eyeglasses worn by the user to a control method for concurrent opening and closing of the left-eye shutter and the right-eye shutter.

3. The stereoscopic video presenting apparatus according to claim 2, further comprising
a control timing determination unit configured to cause the control change unit to change the control method for opening and closing of the left-eye shutter and the right-eye shutter of the eyeglasses worn by the user determined to be in the failure state by the failure state determination unit to the control method for concurrent opening and closing of the left-eye shutter and the right-eye shutter, at a timing at which an amount of convergence of the eye movement of the user is smaller than a predetermined threshold amount of convergence.

4. The stereoscopic video presenting apparatus according to claim 1,
wherein the failure state determination unit is configured to compare amounts of convergence of the eye movements of the plurality of users in a predetermined period to determine, as a user in the failure state who is unable to perceive stereoscopic view, a user whose amount of convergence is smaller than the amounts of convergence of the eye movements of no less than a predetermined number of other users.

5. The stereoscopic video presenting apparatus according to claim 1,
wherein the failure state determination unit is configured to compare the amounts of convergence of the eye movements of the plurality of users at the same time to determine, as a user in the failure state who is too close to a display screen showing the right-eye video and the left-eye video, a user whose amount of convergence is greater than the amounts of convergence of the eye movements of any other users by a predetermined value or greater.

6. The stereoscopic video presenting apparatus according to claim 1,
wherein the failure state determination unit is configured to compare integrated values of the amounts of convergence of the eye movements of the plurality of users in a same period to determine, as a user in the failure state in which the user is fatigued, a user for whom the integrated value is smaller than the integrated values for any other users by a predetermined value or greater.

7. The stereoscopic video presenting apparatus according to claim 1,
wherein the failure state determination unit is configured to compare reaction rates of the eye movements of the plurality of users in a same period to determine, as a user in the failure state in which the user is fatigued, a user for whom the reaction rate is smaller than the reaction rates of any other users by a predetermined value or greater.

8. A stereoscopic video presenting method for presenting a stereoscopic video to a user by controlling opening and closing of a left-eye shutter and a right-eye shutter which are included in eyeglasses for stereoscopic viewing worn by the user, in synchronization with a timing to display a left-eye video and a right-eye video, the stereoscopic video presenting method comprising:

measuring an eye movement of each of users viewing the stereoscopic video;

determining the number of users viewing a same stereoscopic video; and comparing, when it is determined in the determination that the number of users viewing the same stereoscopic video is plurality, eye movements of a plurality of users to determine a user whose eye movement is in a failure state among the plurality of users.

9. A non-transitory computer-readable recording medium having stored therein a program for causing a computer to execute the stereoscopic video presenting method according to claim 8.

\* \* \* \* \*